United States Patent
Nelson et al.

(10) Patent No.: US 9,756,944 B2
(45) Date of Patent: *Sep. 12, 2017

(54) MODULAR FURNITURE ASSEMBLY WITH DUAL COUPLING MECHANISMS

(71) Applicant: SAC ACQUISITION LLC, Stamford, CT (US)

(72) Inventors: Shawn D. Nelson, Darien, CT (US); David M. Underwood, Norwalk, CT (US); Spencer Pearson, Midvale, UT (US); Chelsea Kostek, Bridgeport, CT (US); Brian Kuchler, Stamford, CT (US)

(73) Assignee: The LoveSac Company, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,656

(22) Filed: Mar. 2, 2016

(65) Prior Publication Data

US 2016/0174715 A1    Jun. 23, 2016

Related U.S. Application Data

(63) Continuation-in-part of application No. 14/332,705, filed on Jul. 16, 2014, now Pat. No. 9,277,826, which
(Continued)

(51) Int. Cl.
*A47C 7/00* (2006.01)
*A47C 7/02* (2006.01)
(Continued)

(52) U.S. Cl.
CPC .............. *A47C 4/028* (2013.01); *A47C 7/18* (2013.01); *A47C 7/20* (2013.01); *A47C 13/005* (2013.01);
(Continued)

(58) Field of Classification Search
CPC ..... A47C 13/005; A47C 17/045; A47C 3/029; A47C 7/002
(Continued)

(56) References Cited

U.S. PATENT DOCUMENTS

| 1,236,234 A | 8/1917 | Troje |
| 2,723,896 A | 11/1955 | Wurtz |

(Continued)

FOREIGN PATENT DOCUMENTS

| CH | 403203 | 6/1966 |
| CN | 201022532 Y | 2/2008 |

(Continued)

OTHER PUBLICATIONS

U.S. Appl. No. 11/149,913, mailed Aug. 15, 2006, Office Action.
(Continued)

*Primary Examiner* — Rodney B White
(74) *Attorney, Agent, or Firm* — Workman Nydegger

(57) ABSTRACT

A modular furniture assembly comprising first and second members (e.g., base and transverse member) may have convenient dual coupling mechanisms, for example, a magnetic coupling mechanism and a mechanical (e.g., hook and loop) coupling mechanism. The first member and/or second member may include a fabric or other cover over a foam or other body (e.g., fabric over foam, or other cover over a skeleton). Either or both members may include a rigid core (e.g., a board, skeleton, etc.). The coupling mechanisms may be such as to not detract from any soft, cushioned characteristics of a fabric over foam construction, if such is provided. The coupling structure in the first member and/or the second member may be tethered to the rigid core of the particular member to reduce tenting of the fabric or other cover of the first member and/or the second member as the tethered coupling structure is pulled.

5 Claims, 28 Drawing Sheets

Related U.S. Application Data is a continuation of application No. 13/164,721, filed on Jun. 20, 2011, now Pat. No. 8,783,778, which is a continuation-in-part of application No. 12/484,931, filed on Jun. 15, 2009, now Pat. No. 7,963,612, which is a continuation-in-part of application No. 11/449,074, filed on Jun. 8, 2006, now Pat. No. 7,547,073, and a continuation-in-part of application No. 11/149,913, filed on Jun. 10, 2005, now Pat. No. 7,213,885, application No. 15/058,656, which is a continuation-in-part of application No. 14/993,533, filed on Jan. 12, 2016, and a continuation-in-part of application No. 12/967,671, filed on Dec. 14, 2010, now Pat. No. 9,277,813.

(60) Provisional application No. 62/210,238, filed on Aug. 26, 2015, provisional application No. 61/413,125, filed on Nov. 12, 2010.

(51) Int. Cl.

| | | |
|---|---|---|
| *A47C 4/02* | (2006.01) | |
| *F16B 1/00* | (2006.01) | |
| *F16B 12/00* | (2006.01) | |
| *A47C 7/18* | (2006.01) | |
| *A47C 7/20* | (2006.01) | |
| *A47C 13/00* | (2006.01) | |
| *A47C 17/04* | (2006.01) | |
| *A47C 15/00* | (2006.01) | |
| *A47C 31/00* | (2006.01) | |

(52) U.S. Cl.
CPC .......... *A47C 15/002* (2013.01); *A47C 17/045* (2013.01); *A47C 31/003* (2013.01); *F16B 1/00* (2013.01); *F16B 12/00* (2013.01); *F16B 2001/0028* (2013.01); *F16B 2001/0035* (2013.01); *Y10T 29/49826* (2015.01); *Y10T 403/7164* (2015.01); *Y10T 403/7176* (2015.01)

(58) Field of Classification Search
USPC .............. 297/440.1, 440.14, 440.15, 440.16, 297/452.27, 271.6, 272.1; 403/395, 397; 248/345.1, 188, 188.2, 188.8, 188.9
See application file for complete search history.

(56) References Cited

U.S. PATENT DOCUMENTS

| | | |
|---|---|---|
| 2,751,969 A | 6/1956 | Kruijt |
| 2,793,685 A | 5/1957 | Spitz |
| 2,870,824 A | 1/1959 | LeBarre |
| 3,030,146 A | 4/1962 | Morris |
| 3,137,012 A | 6/1964 | Halterman |
| 3,606,461 A | 9/1971 | Moriyama |
| 3,669,494 A | 6/1972 | Lohmeyer |
| 3,706,473 A | 12/1972 | Mullen |
| 3,787,909 A | 1/1974 | Johnson |
| 3,811,728 A | 5/1974 | Redemske |
| 3,944,281 A | 3/1976 | Piretti |
| 3,973,800 A | 8/1976 | Kogan |
| 4,045,090 A | 8/1977 | Fleisch et al. |
| 4,047,773 A | 9/1977 | Semany |
| 4,077,666 A | 3/1978 | Heumann |
| 4,140,065 A | 2/1979 | Chacon |
| 4,305,616 A | 12/1981 | Martinez |
| 4,509,219 A | 4/1985 | Yagi |
| 4,591,289 A | 5/1986 | Vickers et al. |
| 4,626,218 A | 12/1986 | Wright |
| 4,682,818 A | 7/1987 | Morell |
| 4,753,480 A | 6/1988 | Morell |
| 4,893,958 A | 1/1990 | Wieland |
| 5,112,110 A | 5/1992 | Perkins |
| 5,189,747 A | 3/1993 | Mundy et al. |
| 5,322,345 A | 6/1994 | Desser et al. |
| 2,701,009 A | 2/1995 | Richard |
| 5,492,399 A | 2/1996 | Tillack |
| 5,544,938 A | 8/1996 | Saul et al. |
| 5,738,414 A | 4/1998 | Wieland et al. |
| 5,867,849 A | 2/1999 | Pontrello |
| 5,890,767 A | 4/1999 | Chang |
| 6,063,007 A | 5/2000 | Sithole |
| 6,151,765 A | 11/2000 | Asplund |
| 6,216,894 B1 | 4/2001 | Hendricks |
| 6,241,317 B1 | 6/2001 | Wu |
| 6,267,446 B1 | 7/2001 | Wieland et al. |
| 6,796,614 B1 | 9/2004 | Paul |
| 6,824,220 B1 | 11/2004 | Davison |
| 7,020,911 B2 | 4/2006 | Oldham |
| 7,181,783 B2 | 2/2007 | O'Reilly |
| 7,213,885 B2 | 5/2007 | White et al. |
| 7,252,339 B2 | 8/2007 | Owens |
| 7,296,859 B1 | 11/2007 | Branch, III |
| 7,419,220 B2 | 9/2008 | White et al. |
| 7,448,689 B2 | 11/2008 | Carter et al. |
| 7,481,496 B2 | 1/2009 | Smith |
| 7,547,073 B2 | 6/2009 | White et al. |
| 7,892,065 B2 | 2/2011 | Vicentelli |
| 7,963,612 B2 | 6/2011 | Nelson et al. |
| 8,479,685 B2 | 7/2013 | Sprung |
| 8,783,778 B2 | 7/2014 | Nelson et al. |
| 9,277,813 B2 | 3/2016 | Nelson et al. |
| 9,277,826 B2 | 3/2016 | Nelson et al. |
| 2004/0021359 A1 | 2/2004 | Chang |
| 2007/0085406 A1 | 4/2007 | White et al. |
| 2007/0257539 A1 | 11/2007 | White et al. |
| 2009/0251250 A1 | 10/2009 | Tait |
| 2009/0315382 A1 | 12/2009 | Nelson |
| 2010/0196088 A1 | 8/2010 | Johnsson |
| 2011/0233976 A1 | 9/2011 | Hanson et al. |
| 2011/0298340 A1 | 12/2011 | Nelson et al. |
| 2012/0119629 A1 | 5/2012 | Nelson et al. |
| 2014/0368010 A1 | 12/2014 | Nelson et al. |

FOREIGN PATENT DOCUMENTS

| | | |
|---|---|---|
| DE | 1429323 | 10/1968 |
| DK | 2213205 T3 | 4/2013 |
| EP | 2213205 A1 | 4/2010 |
| JP | 53-6411 | 1/1978 |
| JP | S53-6411 | 1/1978 |
| JP | 2002-045256 | 2/2002 |
| WO | 2006135509 | 12/2006 |
| WO | 2006135855 | 12/2006 |

OTHER PUBLICATIONS

U.S. Appl. No. 11/149,913, mailed Dec. 12, 2006, Notice of Allowance.
U.S. Appl. No. 11/149,913, mailed Jan. 12, 2007, Corrective Notice of Allowance.
U.S. Appl. No. 11/149,913, mailed Apr. 18, 2007, Issue Notification.
U.S. Appl. No. 11/449,074, mailed May 27, 2009, Issue Notification.
U.S. Appl. No. 11/745,325, mailed Oct. 12, 2007, Office Action.
U.S. Appl. No. 11/745,325, mailed May 28, 2008, Notice of Allowance.
U.S. Appl. No. 11/745,325, mailed Jun. 13, 2008, Notice of Allowability.
U.S. Appl. No. 11/745,325, mailed Aug. 13, 2008, Issue Notification.
U.S. Appl. No. 12/484,931, mailed Sep. 10, 2010, Office Action.
U.S. Appl. No. 12/484,931, mailed Oct. 21, 2010, Notice of Allowance.
U.S. Appl. No. 12/484,931, mailed Jan. 5, 2011, Issue Notification.
U.S. Appl. No. 12/484,931, mailed Feb. 11, 2011, Notice of Allowance.
U.S. Appl. No. 12/484,931, mailed Jun. 1, 2011, Issue Notification.
U.S. Appl. No. 12/967,671, mailed Jul. 19, 2013, Office Action.

(56) References Cited

OTHER PUBLICATIONS

U.S. Appl. No. 12/967,671, mailed Feb. 14, 2014, Office Action.
U.S. Appl. No. 12/967,671, mailed Jun. 19, 2014, Office Action.
U.S. Appl. No. 12/967,671, mailed May 6, 2015, Office Action.
U.S. Appl. No. 12/967,671, mailed Nov. 9, 2015, Notice of Allowance.
U.S. Appl. No. 12/967,671, mailed Feb. 17, 2016, Issue Notification.
U.S. Appl. No. 12/164,721, mailed Feb. 27, 2013, Office Action.
U.S. Appl. No. 12/164,721, mailed Jul. 19, 2013, Office Action.
U.S. Appl. No. 13/164,721, mailed Oct. 15, 2013, Notice of Allowance.
U.S. Appl. No. 13/164,721, mailed Feb. 12, 2014, Issue Notification.
U.S. Appl. No. 13/164,721, mailed Mar. 18, 2014, Notice of Allowance.
U.S. Appl. No. 13/164,721, mailed Jul. 2, 2014, Issue Notification.
U.S. Appl. No. 14/332,705, mailed Jun. 15, 2015, Office Action.
U.S. Appl. No. 14/332,705, mailed Oct. 30, 2015, Notice of Allowance.
U.S. Appl. No. 14/332,705, mailed Feb. 17, 2016, Issue Notification.
Extended EP Search Report for EP 06770061.7, published May 10, 2013, (9 pages).
International Search Report & Written Opinion for WO2006/135509, published on Mar. 23, 2007, (10 pages).
International Search Report & Written Opinion for WO2006/135855, published on Nov. 29, 2006, (10 pages).
Japanese Utility Model Application No. Sho 56-102375 (Japanese Utility Model Application laid-open No. Sho 58-8364), filed 1981, published 1983 (19 pages).
U.S. Appl. No. 11/449,074, mailed May 6, 2009, Notice of Allowance.
U.S. Appl. No. 11/449,074, mailed Jun. 16, 2009, Issue Notification.
U.S. Appl. No. 11/449,074, mailed Mar. 3, 2009, Office Action.
U.S. Appl. No. 11/449,074, mailed Oct. 7, 2008, Restriction Requirement.

MODULAR FURNITURE ASSEMBLY WITH DUAL COUPLING MECHANISMS

1. CROSS-REFERENCE TO RELATED APPLICATIONS

This application is a continuation-in-part of U.S. patent application Ser. No. 14/332,705, filed Jul. 16, 2014, entitled MOUNTING PLATFORM FOR MODULAR FURNITURE ASSEMBLY, now U.S. Pat. No. 9,277,826, which is a continuation of U.S. patent application Ser. No. 13/164,721, filed Jun. 20, 2011, entitled MOUNTING PLATFORM FOR MODULAR FURNITURE ASSEMBLY, now U.S. Pat. No. 8,783,778, which is a continuation-in-part of U.S. patent application Ser. No. 12/484,931, filed Jun. 15, 2009, entitled MODULAR FURNITURE ASSEMBLY, now U.S. Pat. No. 7,963,612, which is a continuation-in-part of U.S. patent application Ser. No. 11/449,074, filed Jun. 8, 2006, entitled MODULAR FURNITURE ASSEMBLY, now U.S. Pat. No. 7,547,073, which is a continuation-in-part of U.S. patent application Ser. No. 11/149,913, filed Jun. 10, 2005, entitled MODULAR FURNITURE ASSEMBLY, now U.S. Pat. No. 7,213,885. Each of the foregoing applications is incorporated herein, in its entirety, by reference.

This application is also a continuation-in-part of U.S. patent application Ser. No. 14/993,533, filed Jan. 12, 2016, entitled MODULAR FURNITURE ASSEMBLY WITH DUAL COUPLING MECHANISMS, which: (A) claims priority to and the benefit of U.S. Provisional Patent Application Ser. No. 62/210,238, filed Aug. 26, 2015, entitled MODULAR FURNITURE ASSEMBLY WITH MAGNETIC AND MECHANICAL COUPLING; and (B) is a continuation-in-part of U.S. patent application Ser. No. 12/967,671, filed Dec. 14, 2010, entitled MODULAR FURNITURE ASSEMBLY AND DISPLAY KIT WITH MAGNETIC COUPLING ASSEMBLY, now U.S. Pat. No. 9,277,813, which claims priority to and the benefit of U.S. Provisional Patent Application Ser. No. 61/413,125, filed Nov. 12, 2010, entitled MODULAR FURNITURE ASSEMBLY AND DISPLAY KIT WITH MAGNETIC COUPLING ASSEMBLY. Each of the foregoing applications is incorporated herein, in its entirety, by reference.

2. FIELD OF THE INVENTION

This invention is in the field of modular furniture.

3. BACKGROUND

Modular furniture is useful in a variety of settings. Consumers eager to have options for arranging furniture in multiple ways can purchase modular furniture which will allow them to set up furniture assemblies in one of a plurality of different of manners.

In addition, many traditional couches and other furniture items cannot be moved into tight areas of a home or apartment complex, including, for example, basements, narrow hallways, or upstairs rooms. Thus, it is often desirable to produce furniture that can be conveniently assembled, disassembled and then reassembled in one of a variety of configurations, thus, providing versatility, diversity, and convenience for transport and set up.

Furniture assemblies have been developed in the past that provide the user with the opportunity to set up furniture in various different manners and to conveniently transport one portion of the furniture assembly at a time, rather than requiring the purchaser to negotiate a tight hallway with an entire sofa, for example.

However, the connections between modular assembly furniture pieces are often inconvenient, requiring too many steps for a convenient coupling of the various pieces together. In some, the connections are not sufficiently robust, allowing the pieces to separate when such separation is not desired. As such, there is a continuing need for alternative modular furniture configurations.

BRIEF SUMMARY OF THE INVENTION

The present invention relates to a modular furniture assembly having one or more convenient coupling mechanisms. In one aspect, the modular furniture assembly of the present invention includes a first member, a second member, and dual coupling mechanisms including a magnetically attractive coupling mechanism and a mechanical coupling mechanism for selectively, removably coupling the first member to the second member. In an embodiment, the first and second members may be base members and/or transverse members. The transverse member can be employed adjacent the base member as backrest and/or as an armrest. Multiple transverse members may be employed to provide a backrest and multiple arm rests. Of course, it may also be possible to build in a backrest, armrest, or other feature into a base member, or other member.

The magnetically attractive coupling mechanism may include corresponding components that are magnetically attracted to one another. A portion of the components may be disposed on or within the first member, while another portion of the components may be disposed on or within the second member. The magnetically attractive coupling mechanism may be configured to selectively orient the first member and the second member into desired positions. The mechanical coupling mechanism may include a first member mechanical coupling portion disposed on or within the first member, and a second member mechanical coupling portion on or within the second member. The first member mechanical coupling portion and the second member mechanical coupling portion can be selectively engaged with one another to couple the first member to the second member.

Providing dual coupling mechanisms where one mechanism couples one edge (e.g. the top), while another mechanism couples another edge (e.g., opposite from the first, e.g., the bottom) provides for a very strong connection between the two members, even while using coupling materials typically regarded as weak, temporary, or transient. Such is highly advantageous.

Another aspect of the present invention relates to a modular furniture assembly including a first member (e.g., a base member) and a second member (e.g., a transverse member). Either or both of the first member and second member may include a fabric or other cover over a body, which may include a rigid core. In an embodiment, the construction may be fabric over a foam body, with a rigid board at the core, although various other configurations are also possible. A magnetically attractive coupling mechanism and/or a mechanical coupling mechanism may be provided for selectively, removably coupling the first member to the second member. Any included coupling mechanism may be such as to maintain any soft, fabric over foam characteristics of the first member and second member, should such be provided. For example, in at least one embodiment, no rigid, hard exterior components may be needed on the first member and/or the second member.

While a foam body may be employed in some embodiments (e.g., fabric over foam), various other constructions are also possible. For example, an internal skeleton (e.g., of aluminum or other relatively rigid material) may be provided with a cover wrap (e.g., fabric or otherwise—e.g., wicker) positioned over the internal supporting skeleton. Any of the connection methodologies described herein could be adapted for such embodiments, and others that will be apparent to one of skill in the art in light of the present disclosure. For example, such constructions may be particularly well suited for outdoor use. Foam may still be present if desired (e.g., within cushions).

Another aspect of the present invention relates to a modular furniture assembly including a first member and a second member. Either or both of the first member and the second member may include a fabric or other cover over a body (e.g., which may optionally be foam), where the body includes a rigid core. A coupling mechanism that is a magnetically attractive coupling mechanism and/or a mechanical coupling mechanism may be provided for selectively, removably coupling the first member to the second member. The coupling mechanism may include anti-tenting characteristics to prevent the fabric or other cover material of the first member and/or the second member from "tenting" as a first member and second member are pulled apart from one another. For example, the coupling mechanism may include a first member portion on or within the first member, and a second member portion disposed on or within the second member. The first member portion may be tethered to the rigid core of the first member. The second member portion may be tethered to the rigid core of the second member. Such a rigid core may include a rigid board or other relatively inflexible structure of the body that can serve as an anchor to which the coupling mechanism portions may be tethered. Such tethering reduces, minimizes or prevents tenting of the fabric or other cover(s) as the first member portion (e.g., a magnet, attracted member, VELCRO panel, etc.) is pulled relative to the remainder of the first member, or as the second member portion (e.g., a magnet, attracted member, VELCRO panel, etc.) is pulled relative to the remainder of the second member.

For example, where the coupling mechanism includes a magnetically attractive coupling mechanism, the first member portion of the coupling mechanism (e.g., a magnet or attracted member) may be tethered to the rigid board at the core of the first member (e.g., a base member). Where the coupling mechanism includes a mechanical coupling mechanism, the transverse member portion of the coupling mechanism, e.g., a VELCRO tab, which may extend laterally from a mid-section of the second member (e.g., a transverse member) may be tethered to a rigid board or other relatively inflexible member at the core of the second member. In either case, such tethering may reduce, minimize, or prevent tenting in the surrounding fabric or other cover that would otherwise occur without such tethering.

Such anti-tenting characteristics may be provided in various other manners where the coupling mechanism (e.g., magnetic, mechanical, or otherwise) is tethered to some structure (e.g., a rigid structure) of the base member or transverse member, the rigid board core merely being an example of such. Such tethering mechanisms reduce or eliminate slack within the tethered construction chain, anchoring a desired structure (e.g., the fabric cover in the vicinity of a coupling mechanism that may otherwise pull, stretch, and/or "tent" the cover) in order to minimize or reduce such characteristics. Other specific mechanisms by which tethering of the coupling components may be provided so as to reduce tenting of a fabric or other cover material will be apparent to one of skill in the art in light of the present disclosure.

In an embodiment, the furniture assembly may include transverse members, where each of the transverse members has the same dimensions, i.e., the same height, width and length, such that a single base member can be employed with multiple transverse members, forming a convenient chair when used in connection with a base member.

In yet a further aspect of the invention, multiple bases having the same dimensions and multiple transverse members having the same dimensions may be employed in order to provide the user with the opportunity to make a variety of different furniture configurations, as will be discussed and disclosed herein. The modular furniture assembly of the present invention enables the selective, removable coupling of the base members to the transverse members and/or the base members to each other, while preserving any soft characteristics of fabric over foam members (e.g., without hard, rigid exoskeleton or other hard, rigid exterior connection mechanisms), should such be provided. It will be readily apparent that some embodiments may not necessarily employ fabric over foam construction, and such embodiments could provide similar connectivity benefits through use of similar connection mechanisms as described herein principally in the context of fabric over foam, but which can be implemented in other constructions as well. It will be further apparent that specialty shaped bases or transverse members may be provided, for connection to any other desired member, as desired. Examples of such specialty shaped members include, but are not limited to wedge shaped bases or other members, deep side base, transverse, or other members, members incorporating armrests and/or backrests, and the like.

In an embodiment, the base member may comprise a dense foam body with a fabric cover thereover (e.g., inner and outer fabric covers). Where a magnetically attractive coupling mechanism is provided, a plurality of magnets and/or attracted members may be provided, e.g., stitched into pockets of any fabric cover (e.g., in an inner cover). The transverse member may also comprise a dense foam body (e.g., even denser, harder, or stiffer than the base member). Where a magnetically attractive coupling mechanism is provided, a plurality of magnets and/or attracted members may be provided (e.g., stitched into pockets of an inner cover of the transverse member).

Where a magnetically attractive coupling mechanism is provided, the magnets or attracted members of the first member (e.g., a base member) attract the magnets or attracted members of the second member(s) (e.g., a transverse member), thereby causing the second member(s) to be attracted to the first member and to couple against the first member when the magnetic forces of the first member are close enough to the second member(s) to cause the second member(s) to be coupled to the first member. By placing a second member in sufficient proximity to the first member that the magnetic forces of one member (e.g., the base member) pull the other member thereagainst, the second member and first member are coupled to each other in such a manner that the furniture assembly can be used as furniture.

In an embodiment, in addition to a magnetically attractive coupling mechanism (which is helpful in aiding the first member and second member(s) in orienting and aligning themselves in a proper orientation for coupling), a mechanical coupling mechanism is also provided. For example, one of the members (e.g., the transverse member(s)) may include a VELCRO tab (e.g., including the hook portion of the VELCRO), which extends laterally from member (e.g., the transverse member). This tab can be stretched over a surface of the other member (e.g., the base member) to which it becomes engaged. For example, a VELCRO tab of the transverse member can engage a top surface of the base member (which may include the loop portion of the VELCRO), securing the base member and transverse member to one another. Of course, the locations of the hook and loop (or other mechanical coupling portions) can be switched with one another. Such a dual coupling mechanism is particularly sturdy, reliable, and beneficial. Because no hard, rigid connections are required on the exterior of the members, it also preserves the soft characteristics of a fabric over foam construction of the base members and transverse members, should such be provided.

More generally speaking, the mechanical coupling mechanism may be any variety of semi-permanent (e.g., adjustable, but holds in place once positioned) coupling mechanism that may be positioned at end, edge or other locations or portions where the two members (e.g., a transverse member and a base member) meet up. Such mechanical coupling mechanisms may be positioned at an opposite end, edge, or other portions as compared to where any magnetic coupling mechanism is provided. For example, where the magnetic coupling mechanism is provided at a bottom edge or end of the base member, the mechanical coupling mechanism may be provided at an opposite, top end of the base member. Various other possible embodiments will be apparent to those of skill in the art in light of the present disclosure.

In one embodiment, the modular furniture assembly is designed for toddlers or children e.g., ages 2-4, or about 2-10, for example, weighing less than about fifty pounds. Because of the relatively small size of such users, and particularly where dual coupling mechanisms are provided, relatively less powerful magnets may be employed. The children can enjoy moving the modular pieces around into different configurations and can also enjoy using the furniture when placed into a configuration suitable for sitting or reclining, for example. Where larger, e.g., full size furniture modules are provided, strong magnets may be employed, although it will be appreciated that the described coupling mechanisms can be adapted for use therein.

U.S. Pat. Nos. 7,963,612; 7,547,073 and 7,213,885, entitled "Modular Furniture Assembly", and U.S. Pat. No. 8,783,778 and U.S. Publication No. 20140368010, entitled "Mounting Platform for Modular Furniture Assembly", each of which are incorporated herein by reference, disclose modular furniture assemblies in which a base and a transverse member, and/or multiple bases and transverse members, can be used in a variety of different configurations in light of their novel dimensions and relationships, such as x=y+z, wherein x is the length of the base, y is the width of the base, and z is the width of the transverse member.

In one aspect, the modular furniture assembly includes a base member, a transverse member, and a coupling assembly configured to enable the base member to be selectively, removably coupled to the transverse member. The height "H" of the transverse member is significantly greater than the height "H" of the base member. The transverse member can be employed adjacent the base member as a backrest and/or as an armrest. In further aspects of the invention, multiple base members and/or transverse members are employed. For example, in one aspect a base member is selectively, removably coupled to a first transverse member, which acts as a backrest, and to first and second side transverse members, which act as arm rests, when the user is sitting on the base member with the user's back against the backrest.

While described principally in the context of placing magnets in the base member, and non-magnetic (but magnetically attractable) metallic slugs in the transverse member, it will be appreciated that magnets may be placed in the transverse member, and metallic slugs in the base member. Also, magnets and/or attracted members (e.g., magnets or metallic slugs) may be positioned in either, so as to allow attraction between corresponding components as the base member and transverse member are brought together, as will be appreciated by one of skill in the art.

DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A-5D schematically illustrate (i.e., in simplified form) an exemplary magnetic coupling mechanism and associated magnetic coupling assembly of a modular furniture assembly.

FIG. 1A is an exploded view showing components of the modular furniture assembly.

FIGS. 5A-5D are schematic views showing additional possible assembled modular furniture assemblies.

FIG. 6B is a representation of the chair of FIG. 6A with an armrest added.

FIGS. 7A through 7I show various furniture assembles that can be formed using modular components of the present invention, all of which are examples of modular furniture assemblies of the present invention.

FIGS. 9A-10D show various views of an exemplary base member that may form part of a modular furniture assembly including dual coupling mechanisms, illustrating how it may be provided with both a portion of a magnetic, attractive coupling mechanism and also a portion of a mechanical coupling mechanism.

FIG. 9A shows an exemplary fabric-over-foam base member that may include an outer cover, an inner cover, a foam body, and a rigid board or other rigid member at its core.

FIG. 10D is a close up view showing the tethering mechanism illustrated in FIG. 10C.

FIGS. 11-16C show various views of an exemplary transverse member that may form part of a modular furniture assembly including dual coupling mechanisms, illustrating how it may be provided with both a portion of a magnetic, attractive coupling mechanism and also a portion of a mechanical coupling mechanism for providing dual coupling mechanisms between the base member and the transverse member when the two are coupled together.

FIG. 11 shows an exemplary fabric-over-foam transverse member which may include an outer cover, an inner cover, a foam body, and a rigid board or other rigid member at its core. A mechanical coupling mechanism (e.g., hook and loop such as VELCRO) is shown in the form of a tab extending laterally from one face of the outer cover, from a mid-section thereof. The VELCRO tab can be extended over the top face of the base member, coupling the two together.

FIG. 13 shows the transverse member of FIG. 11, illustrating a view into the open end (e.g., unzipped) of the inner cover, with the foam body layers pulled away from the rigid board core of the transverse member.

FIG. 16C shows a view within the interior of the transverse member, with the inner cover pulled down, so as to expose the foam body, also showing the foam body pulled away, to expose the underlying rigid core and the strap which is stitched into one side of the interior zipper, tethering the zipper to the rigid core.

DETAILED DESCRIPTION OF THE PREFERRED EMBODIMENTS

FIGS. 1A-5D are schematic representations of a modular furniture assembly with a magnetically attractive coupling assembly (also referred to herein as a magnetic coupling assembly), illustrating how the magnets and/or attracted members may be arranged so as to allow selective, removable coupling of the various members in variously configured modular furniture assemblies.

Figure 1A:
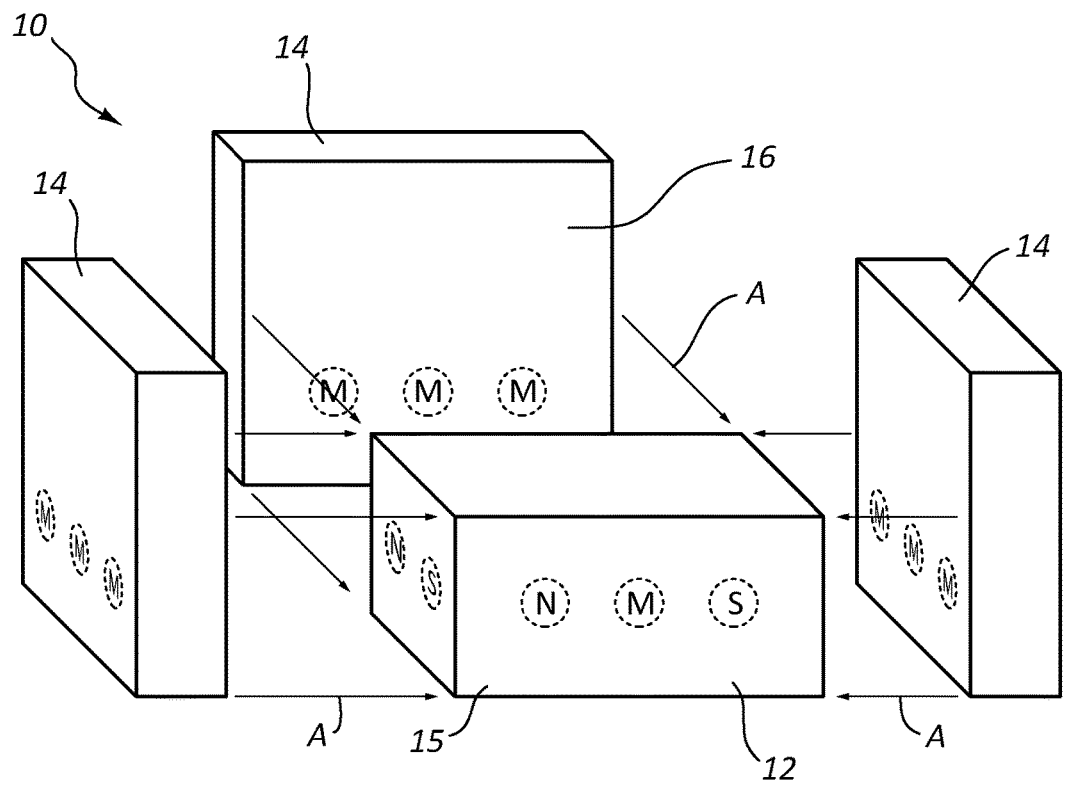
Figure 1B:
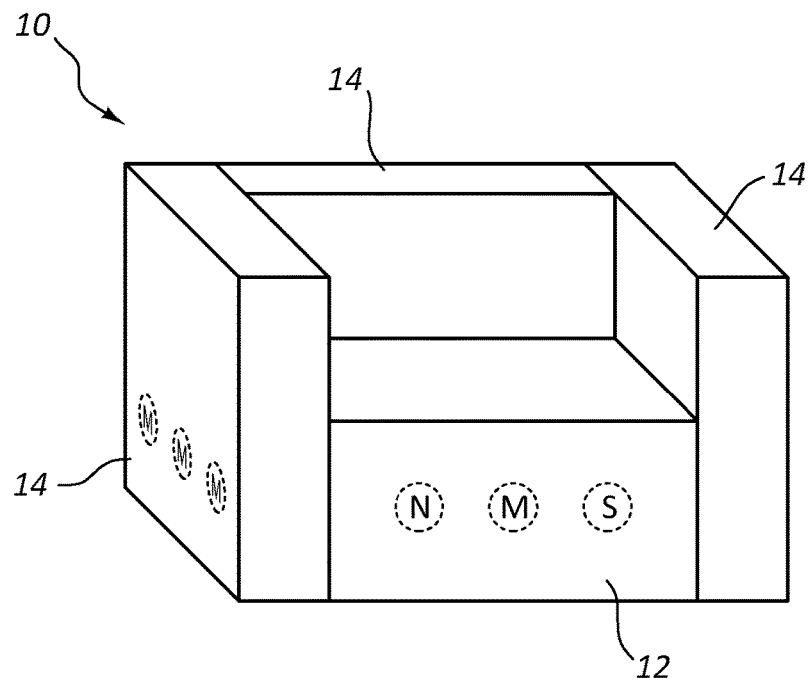
FIG. 1B is a view of the modular furniture assembly of FIG. 1A in an assembled configuration.
Figure 1C:
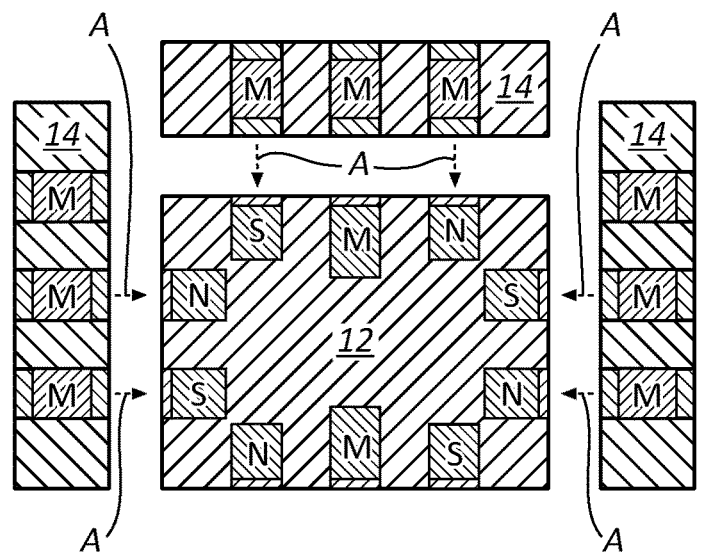
FIG. 1C is a cross-sectional view schematically illustrating how the base member and transverse member may include magnets and/or attracted members for providing attractive forces ("A") between the base member and the transverse members.
Figure 1D:
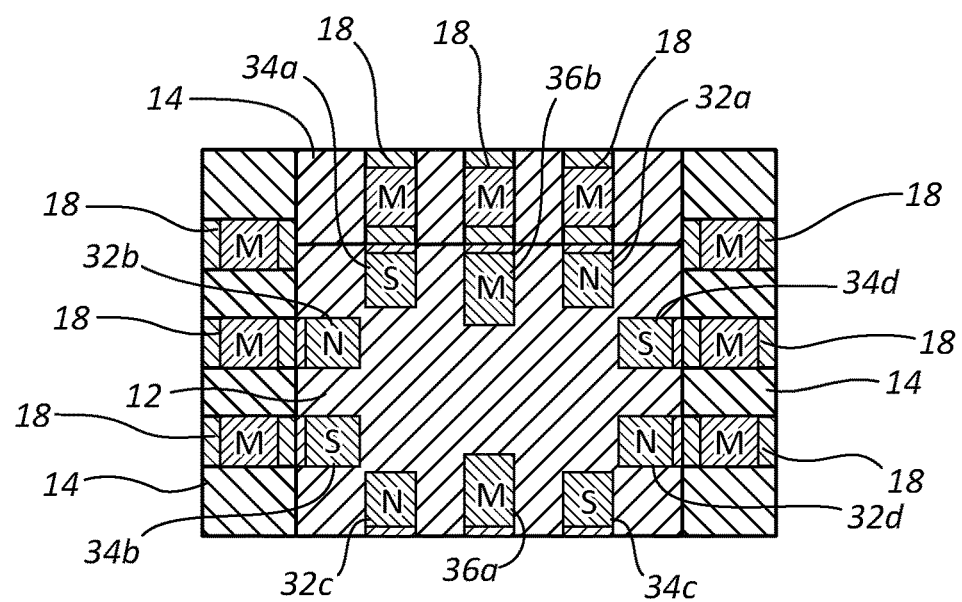
FIG. 1D is a schematic view similar to that of FIG. 1C, with the base member and transverse members shown in an assembled configuration.

FIG. 1A shows an assembly 10 with a magnetic coupling assembly, while FIG. 1B is a view of the furniture assembly 10 of FIG. 1A in an assembled configuration. FIGS. 1C and 1D show possible positions of magnets and/or attracted members in the base member and transverse members for the assembly 10 of FIGS. 1A and 1B.

Modular furniture assembly 10 comprises a base member 12 and three transverse members 14 that are selectively, removably coupled by a magnetic coupling assembly to base member 12. The magnetic coupling assembly is comprised of at least one magnet and at least one attracted member, e.g., another magnet, or a metallic slug.

In the present disclosure, magnets that have a north end located on the periphery of base 12 are referred to as north magnets "N" while those magnets having a south end on the periphery of base 12 are referred to as south magnets "S". Attracted members, which are attracted to the magnets "N" or "S" are identified as "M", representing that the attracted members may be metallic members (e.g., metallic slugs), for example, within respective transverse members 14 and bases 12. Although in an embodiment, the magnets and/or attracted members may be placed in the transverse members and/or the base members as desired, the particular illustrated embodiment shows magnets located within the bases 12, with only non-magnetic (e.g., metallic slugs) attracted members in the transverse members.

As shown in FIG. 1A, each transverse member 14 may be substantially taller than base member 12. Base member 12 may have a length "X" (FIG. 2A) and transverse member may have a length "X'" (FIG. 3A), that are substantially similar to each other. The length X of the base and the length X' of the transverse member are each substantially similar to the sum of the width "Y" of the base 12 and the width "Z" of the transverse member 14. Thus, X=Y+Z. In addition, X'=Y+Z. By substantially similar or substantially equal, e.g., in an embodiment, the relationship may be within 10% of the mathematical relationships X=Y+Z and X'=Y+Z. The phrase "substantially similar" or "substantially equal" may not necessarily be so limited, depending on the particular embodiment, as will be appreciated by those of skill in the art, the 10% value merely representing one possible example.

Using the X=Y+Z relationships, a variety of different furniture configurations can be formed, as disclosed in U.S. Pat. Nos. 7,213,885; 7,547,073; 7,963,612; 8,783,778 and U.S. Publication No. 20140368010, already incorporated by reference, and as reflected in FIGS. 1A-1D and FIGS. 5A-5D, for example.

Optionally, a single transverse member 14 may be employed to form a simple chair, two transverse members 14 may be employed to create a chair with a single arm rest, and three or more transverse members 14 may be employed to form the furniture assembly of FIG. 1B and/or the furniture assemblies further shown in FIGS. 5A-5D, for example.

Figure 2A:
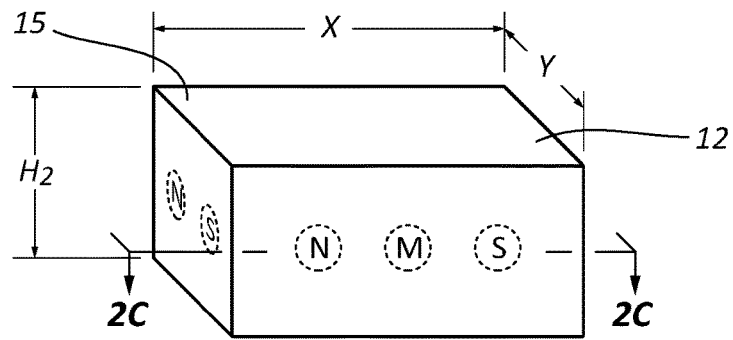
FIG. 2A is a schematic view of a base member of a modular furniture assembly.
Figure 2B:
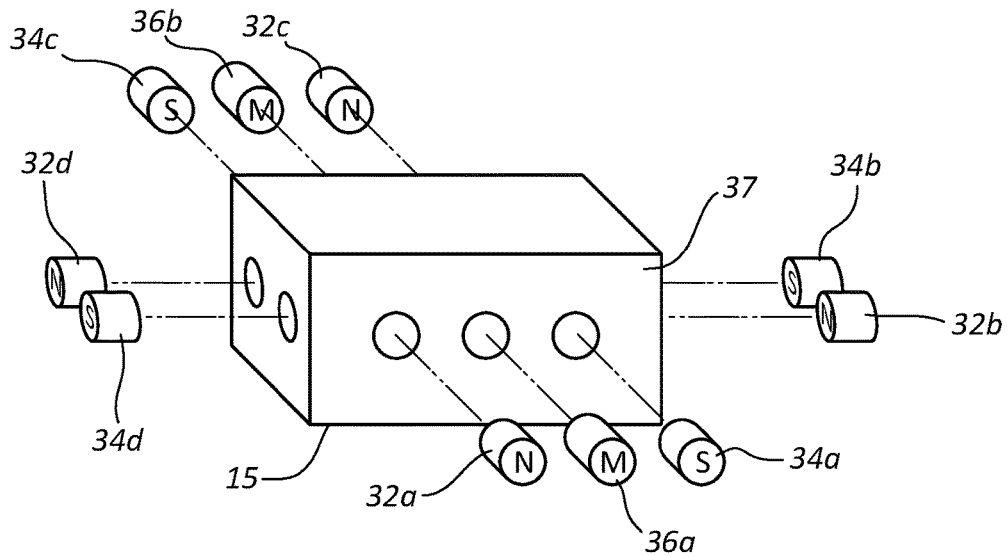
FIG. 2B is an exploded view of the base member of FIG. 2A.
Figure 2C:
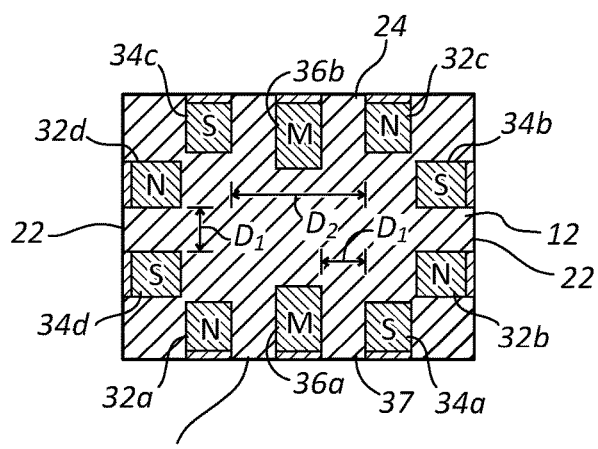
FIG. 2C is a cross-sectional view schematically illustrating an exemplary arrangement of magnets and attracted members in the base member.

With reference now to FIGS. 1A-1D and 2A-2C base member 12 will now be described in further detail. Base member 12 comprises a base body 15 such as a fabric over foam body (e.g., a fabric cover over a foam body). As described elsewhere herein, other constructions are possible. Body 15 may have (i) a plurality of north magnets 32a-32d and south magnets 34a-34d, and (ii) a plurality of attracted members (e.g., non-magnetic metallic members attracted to magnets) 36a, 36b disposed therein as shown in FIGS. 2A-2C. Such magnets and/or attracted members may be positioned within body 15 of base member 12 through any suitable mechanism. For example, in an embodiment the magnets and attracted members may be secured within pockets stitched into the fabric cover of the base member 12 (e.g., pockets stitched in an inner fabric cover). Such magnets may not be removable from the base member. For example, a pocket in which each individual magnet or attracted member is positioned may be closed by stitching or other mechanism on all sides around the magnet or attracted member. Additional details of such a fabric over foam body construction is described herein in conjunction with FIGS. 9A-10D. Thus, the magnetic coupling assembly of the present invention comprises at least one magnet and at least one attracted member, and preferably a plurality of magnets and attracted members. Magnets 32a-32d and 34a-34d are strategically oriented within body 15, so as to form an optimally positionable furniture assembly.

As shown in FIGS. 1C-1D and 2A-2C, body 15 may have an oblong rectangular shape (e.g., a rectangular prism), i.e., body 15 may be a non-square rectangle. Oblong rectangular base 12 may include two opposing ends 22 and two opposing sides 24. Sides 24 are longer than ends 22 (see FIG. 2C).

The oblong rectangular base 12 is shown as including eight magnets therein, which are spaced about the periphery of base body 15 in an alternating polar relationship. Thus, the north magnets 32*a-d* and the south magnets 34*a-d* alternate with each other about the periphery of the base 15.

In between the north and south magnets on sides 24 is shown a metallic member 36*a*, 36*b*, which enables proper connections to other bases, as shown and discussed herein. Metallic members 36*a*, 36*b* are placed along opposing sides 24 of base 12 so as to be attracted to the magnetic members of other bases 12 when it is desired to couple one base to another base.

Thus, the magnets of base 12 may be placed in an alternating pattern such that a north magnet alternates with a south magnet, except that a non-magnetic metallic member may be located between magnets on the sides 24 of base 12. As a result, identical bases 12, i.e., bases 12 having identical configurations and magnet patterns, can be connected to each other in an aligned relationship and can be used to form various configurations of base assemblies, as shown in FIGS. 1A-5D.

The end magnets 32*d*, 34*d* and end magnets 32*b*, 34*b* may be spaced from each other a distance "D1" (See FIG. 2C). Furthermore, side magnets 32*a*, 34*a* and side magnets 32*c*, 34*c* may each be spaced from a corresponding adjacent metallic member 36*a*, 36*b* a respective distance D1. In addition, the side magnets 32*a*, 34*a* and side magnets 32*c*, 34*c* are spaced from each other a distance "D2".

Figure 3A:
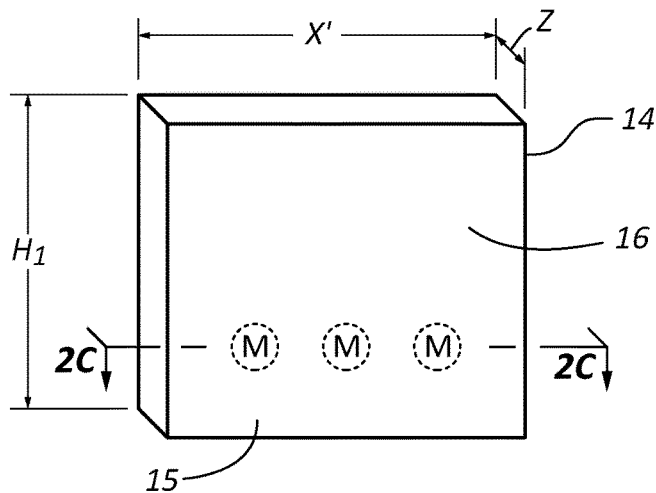
FIG. 3A is a schematic view of a transverse member of a modular furniture assembly.
Figure 3B:
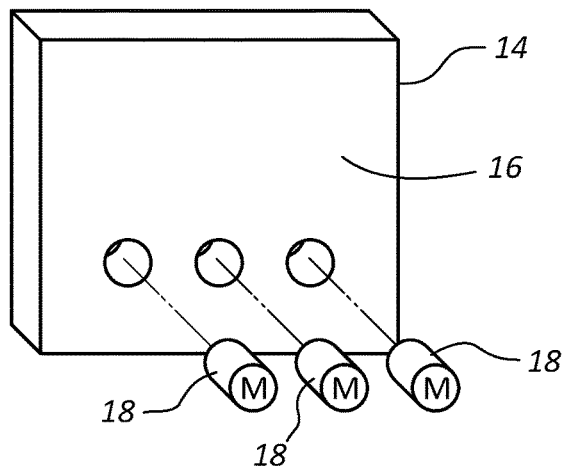
FIG. 3B is an exploded view of the transverse member of FIG. 3A.
Figure 3C:
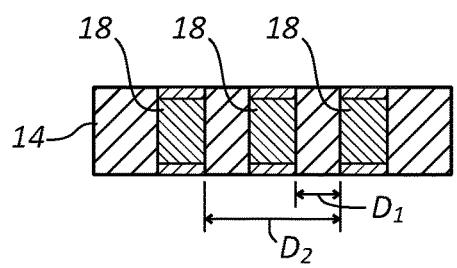
FIG. 3C is a cross-sectional view schematically illustrating an exemplary arrangement of attracted members in the transverse member.

The distance "D1" also corresponds to the distance "D1" between adjacent metallic members 18 of the transverse members 14, as shown in FIG. 3C. In the illustrated configuration there are three metallic members 18 in each transverse member 14. The distance "D2" corresponds to the distance "D2" between the outermost metallic members 18 (see FIG. 3C). Metallic members of transverse member 14 will connect to either north or south magnets.

Figure 4A:
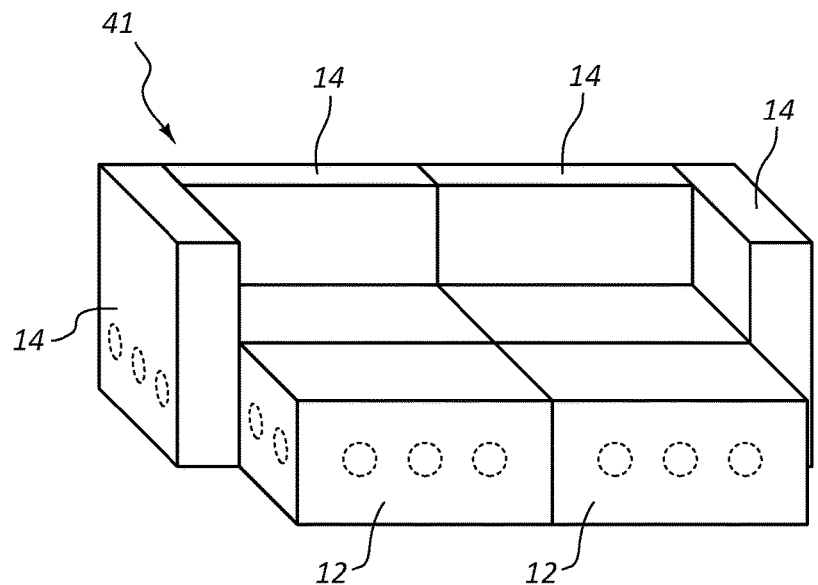
FIG. 4A is a schematic view of an assembled exemplary modular furniture assembly.
Figure 4B:
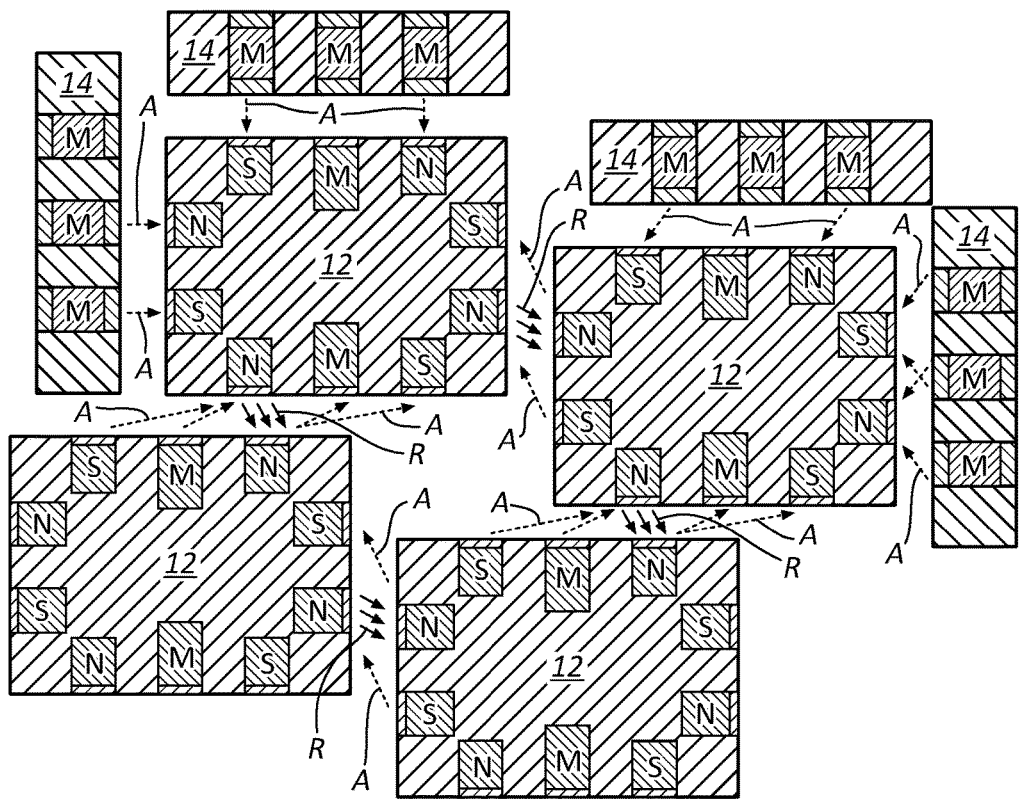
FIG. 4B is a cross-sectional schematic view illustrating how the base members and transverse members may include magnets and/or attracted members providing attractive forces "A" and/or repulsive forces "R" that either attract or repel portions of the modular furniture assembly such that the magnetic coupling assembly encourages proper orientation of respective components of the modular furniture assembly.
Figure 5A:
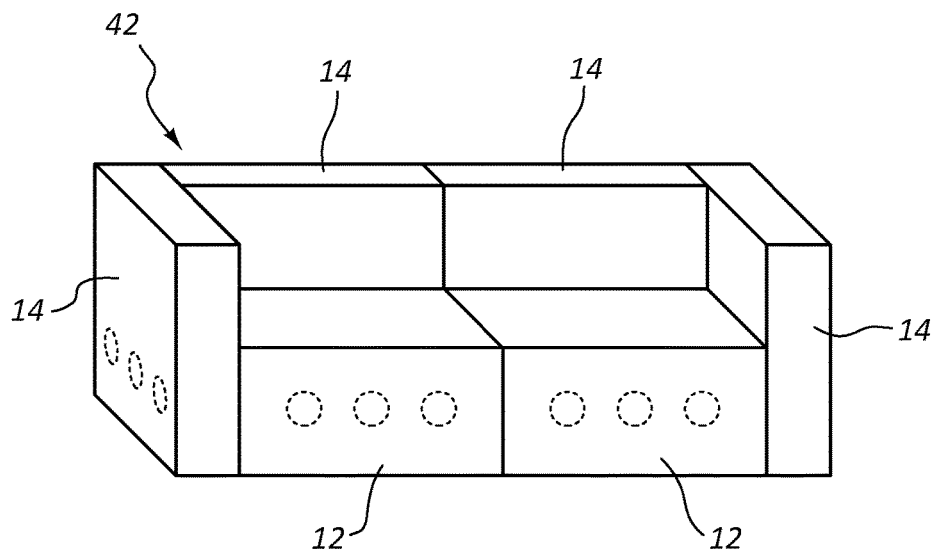
Figure 5B:
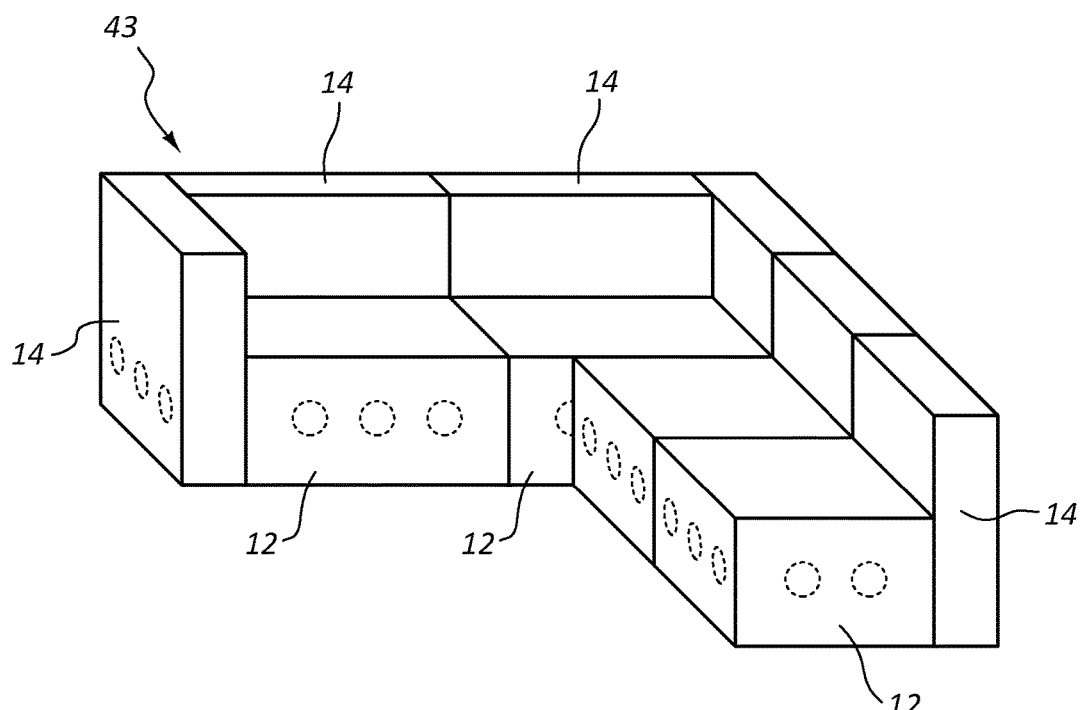
Figure 5C:
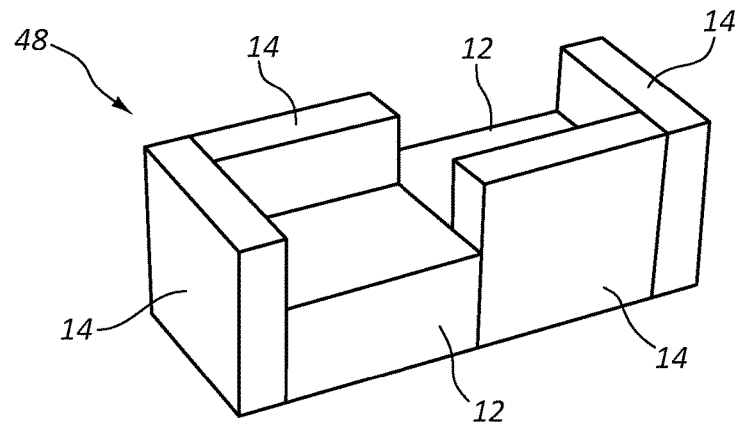
Figure 5D:
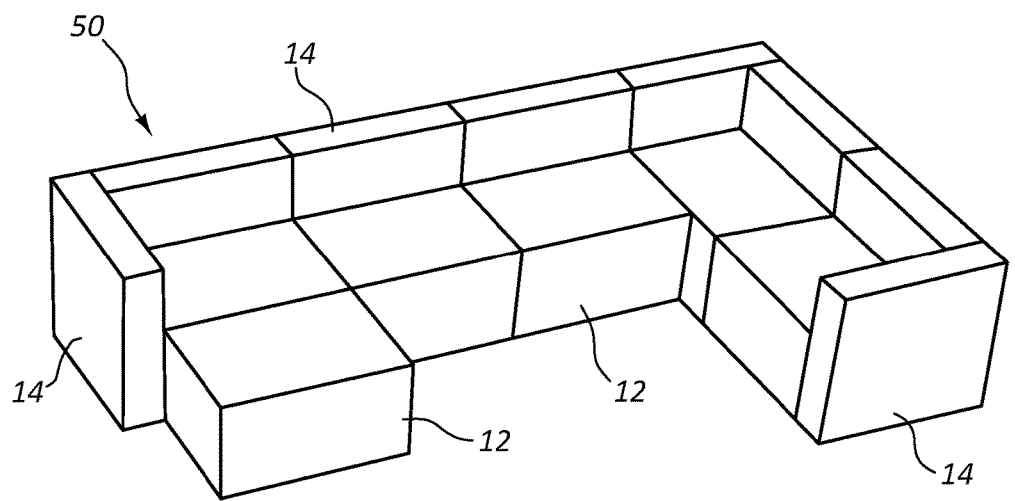

In light of this spacing and magnet placement pattern, a variety of different configurations of the modular furniture assembly can be formed, as shown in FIGS. 1A-5D. For example, as shown in FIGS. 1A-1D, two metallic members 18 of respective transverse members 14 can be conveniently coupled to respective magnets at the ends 22 of base 12, while two metallic members 18 of a transverse member 14 can be coupled to two respective magnets on a side 24 of base 12. Furthermore, a side 24 of a base can be coupled to a side 24 of another base, and an end 22 of a base 12 can be coupled to an end 22 of another base 12, as shown in FIGS. 4A-4B. Optionally, an end 22 of a base 12 can be coupled to a side 24 of a base, as shown in FIGS. 5B and 5D.

The pattern of magnets with opposite polarity spaced in an alternating pattern about the periphery of oblong rectangular base 12 enables multiple identical bases to be attached to each other on the sides, ends and a variety of different combinations, as disclosed herein. A number of different combinations can also be achieved, as discussed and described throughout this specification and the accompanying drawings.

As shown in FIGS. 1A-1B, and further in FIGS. 3A-3C, transverse member 14 may comprises a body 16, e.g., a fabric cover over a foam body, and a plurality of attracted members, such as metallic members 18 represented as "M", e.g., metallic slugs, which are attracted to the magnets of base member 12. Metallic members may be positioned within pockets in the fabric cover (e.g., an inner fabric cover). Additional details of such a fabric over foam body construction is described herein in conjunction with FIGS. 11-16C. The magnets and the metallic members 18 form a magnetic coupling assembly configured to selectively, removably couple base 12 to transverse member 14.

The transverse member 14 can be equally attracted to the magnets of base 12 in either a front or back orientation. In another embodiment, such as that shown in FIGS. 8A-16C, the attracted members (e.g., metallic members 18) in transverse member 14 may be provided in only the front face of the transverse member (e.g., the same face that the laterally extending VELCRO tab extends from, as will be described in greater detail below).

FIG. 1C shows various attractive forces (represented as Force "A") between the base 12 and the transverse members 14. As reflected in FIG. 1C, base 12 attracts one or more transverse members 14 that are placed in sufficient proximity to base member 12 such that the magnets of base member 12 attract the metallic members "M" of transverse member 14. Once the base member 12 and the transverse members 14 of FIG. 1A are placed in sufficient proximity with each other, the magnetic coupling assembly causes the furniture assembly to conveniently orient into the chair assembly of FIGS. 1B and 1D. When the metallic members of transverse members 14 are placed in sufficient proximity to the magnetic members of base 12, the attractive forces "A" of the magnets cause the transverse members 14 to be conveniently aligned into a desired position with respect to each other. The strength of the magnets can be adjusted based on the specific needs. For example, where dual coupling mechanisms are provided, relatively weaker magnets may be employed.

FIGS. 4A-4B are schematic representations of a modular furniture assembly having a magnetic coupling assembly. FIG. 4A shows various attractive forces "A" and various repulsive forces "R" that either attract or repel portions of the modular furniture assembly such that the magnetic coupling assembly encourages proper orientation of respective components of the modular furniture assembly.

As shown in FIG. 4A, the attractive forces pull the transverse members such that the transverse members are conveniently pulled to a desired orientation so as to fit in the assembled position. Thus, the magnetic coupling assembly assists somewhat in orienting the bases 12 transverse members 14 into the proper location once they have generally been placed into sufficient proximity to each other that the magnetic forces attract them into the appropriate positions.

Therefore, complex furniture assemblies can be conveniently formed using respective magnets and metallic members. Thus, using the four base members 12 and the four transverse members 14 of FIGS. 4A-B, the sofa with foot rest assembly of FIG. 4A can be conveniently configured and positioned with the components being located in precise locations in a very quick and efficient manner.

This dynamic of causing proper orientation is particularly useful when more complex furniture assemblies are formed, as shown in FIGS. 5A-5D. The user can move the pieces close to each other while relying on the magnetic coupling assembly to provide precise positioning for the members once the members are oriented into a generally correct location. Furthermore, where dual coupling mechanisms are provided (e.g., a mechanical coupling in addition to a magnetic coupling), the mechanical coupling structures (e.g., a VELCRO tab on the transverse member and corresponding hook or loop on the base member) may be engaged with one another, after the magnetic coupling has already occurred.

By employing the magnetic coupling assembly of the present invention, it is possible to achieve the desired relationship of the length x being substantially equal to the width y of the base plus the width z of the transverse member in complex furniture assemblies. As a result, a variety of precisely oriented furniture configurations can be selectively, removably coupled to each other through the use of the magnetic furniture assembly.

It is also possible to achieve various positions by flipping base(s) 12 upside down, and achieving additional relationships with bases 12 and transverse members 14.

The height "H" of the transverse member 14 is significantly greater than the height "H" of the base member 12. In one embodiment, "significantly greater" means that the transverse member is at least 20% greater in height than the base member. For example, it may be at least 50% greater, or at least 100% greater. As described elsewhere herein, the furniture assemblies are not limited to coupling a transverse member to a base member, as any member may be coupled to any other member, the base member and transverse members merely being an example. Other configurations will be apparent to those of skill in the art.

The magnets and the attracted members of base 12 and transverse member 14 may each be approximately the same distance from the bottoms of base 12 and transverse member 14 such that the magnets and attracted members are aligned with each other when the bases and transverse members are placed adjacent to each other.

Figure 6A:
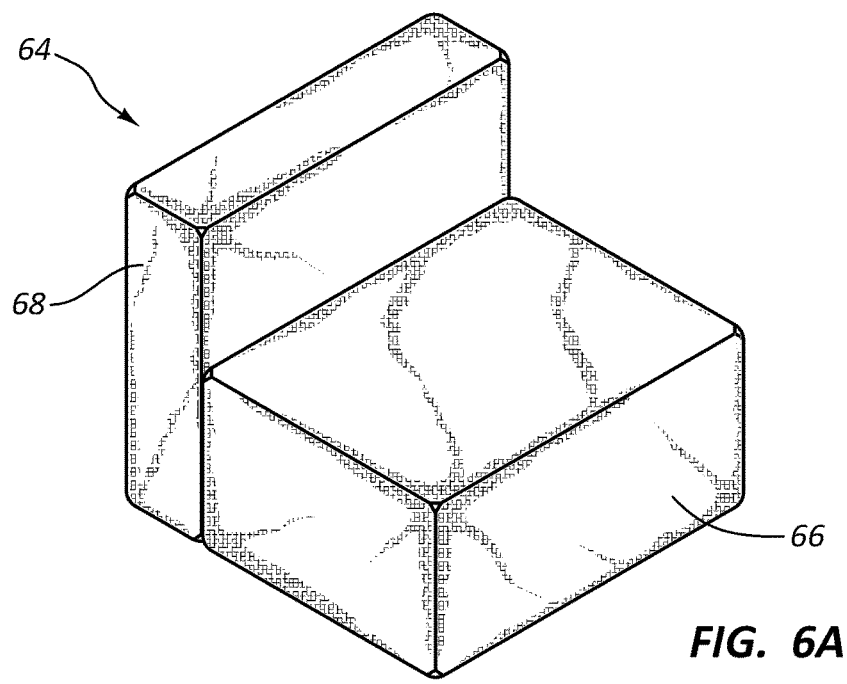
FIGS. 6A-6B represent depictions of a modular furniture assembly of the present invention comprising fabric over a foam body, where the furniture assemblies include a magnetic coupling assembly. The magnets and/or attracted members may be provided within the transverse member(s) and/or base member(s). For example, the magnets and/or attracted members may be provided within pockets in a fabric cover that fits over the foam bodies. Positioning of the magnets and/or attracted members may be as shown schematically in FIGS. 1A-5B, for example. In an embodiment, the magnets and/or attracted members may be positioned within pockets, and may be tethered to a rigid board at the core of the base member(s) and/or transverse member(s). For example, a foam body may be provided about a rigid board core, and an inner cover (e.g., fabric) placed over the foam body. The inner cover may include pockets formed therein, into which the magnets and/or attracted members may be positioned. An outer cover may be placed over the inner cover. The magnets and/or attracted members may be tethered to the rigid board core, as described herein.
Figure 6B:
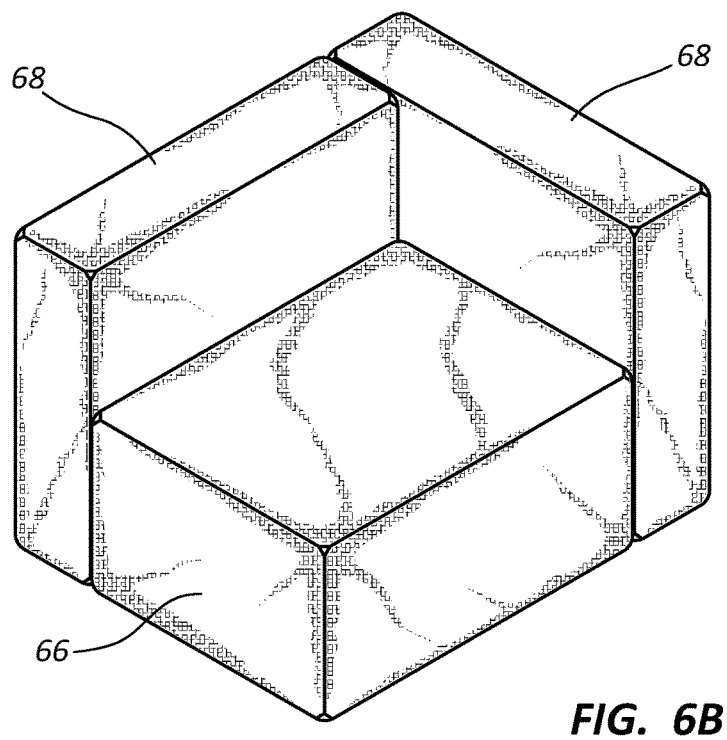

Turning now to FIGS. 6A-6B, these Figures represent depictions of a modular furniture assembly 64 of the present invention comprising a body, e.g., a foam body covered by a fabric cover, having a magnetic coupling assembly therein. In other embodiments, other than fabric over foam construction may be provided. The magnets and attracted members may be trapped within closed pockets stitched into the fabric or other cover (e.g., in an inner cover that is over the foam body, which inner cover is finally covered by an outer cover). The bodies may further include a rigid core (e.g., a board). Such bodies may be base members and/or transverse members as described herein. Such additional details are shown and described in conjunction with FIGS. 8-17. Positioning of the magnets and attracted members may be in a similar manner to that disclosed in the embodiments of FIGS. 1A-5C, for example. FIG. 6B is a representation of the chair 64 formed of a base member 66 and transverse member 68 of FIG. 6A with an armrest (another transverse member 68) added.

With reference to FIGS. 6A through 7I, the modular furniture assembly designs of the present invention can be employed in a setting in which the bodies of the base and transverse members are comprised of a foam material, e.g., a foam that is dense enough for an individual, such as a toddler or small child to use for sitting or reclining. The foam body of the base members may be softer (i.e., more easily compressed, less stiff) than the foam of the transverse members, for better comfort. Foam or other constructions suitable for adult use are of course also possible.

With reference to FIGS. 6A-6B for example, modular furniture assembly 64 comprises a base 66 and a transverse member 68 in the form of a backrest. The height of the transverse member 68 is substantially greater than the height of the base 66. One or more additional transverse members 68 may be added, as shown in FIG. 6B and FIGS. 7C-7I. When members 66 and 68 are comprised of fabric over foam, it is convenient for a small child to play with the foam members and to orient them into desired furniture positions. The magnetic coupling assembly helps to orient the furniture into proper positions, while the child is able to both reorient the base 66 and transverse member 68 into different positions and play with the foam members.

As described in conjunction with FIGS. 1A-5D, the magnetic members may be offset from each other in an alternating polar relationship about the periphery of the oblong rectangular shaped base 66. Metallic members may be disposed between magnets on the long sides of base 66. The opposite polar orientations of respective magnets enable the furniture assemblies to be positioned in relation to each other such that the proper alignments are formed as shown in FIGS. 1A-7I.

Figure 7A:
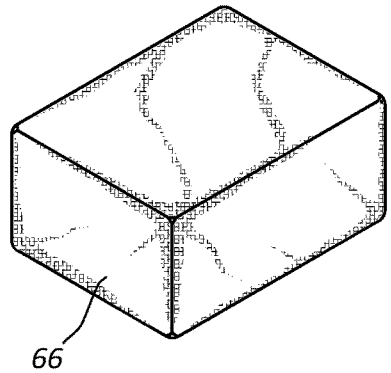
Figure 7B:
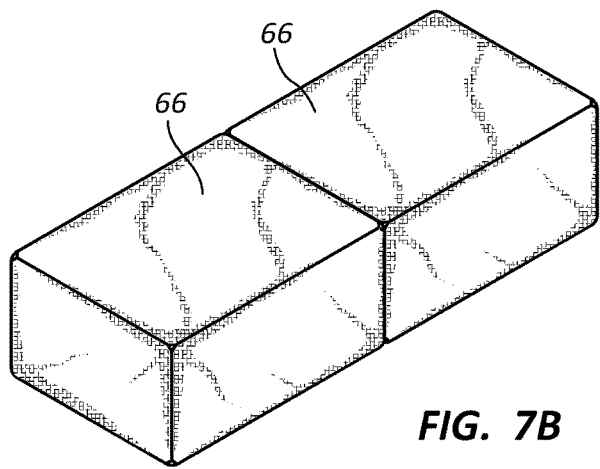
Figure 7C:
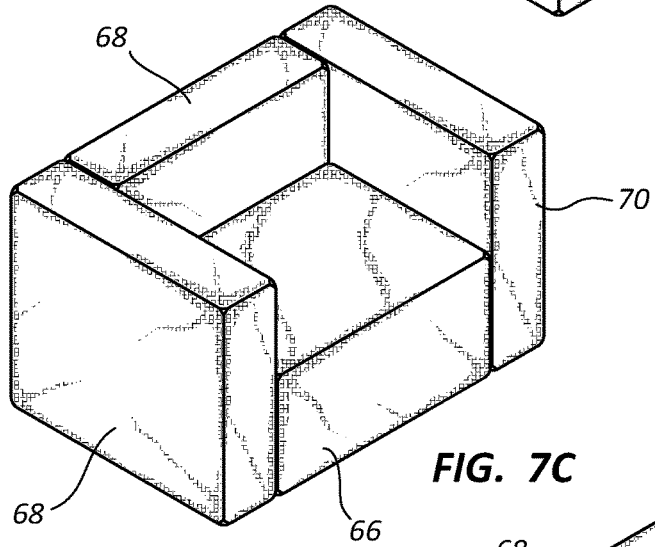
Figure 7D:
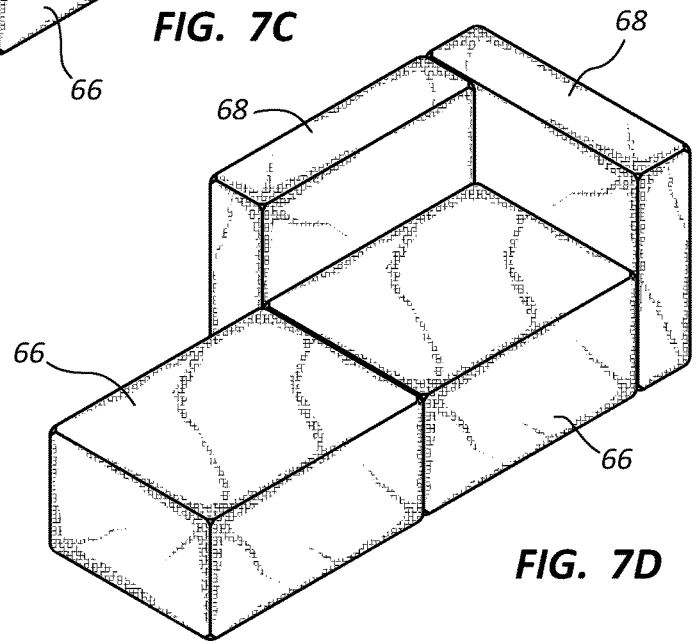
Figure 7E:
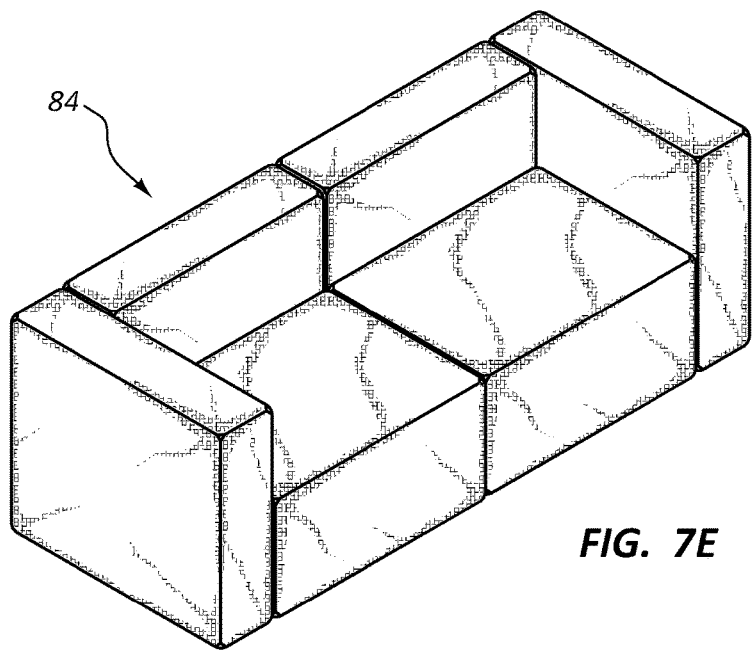
Figure 7F:
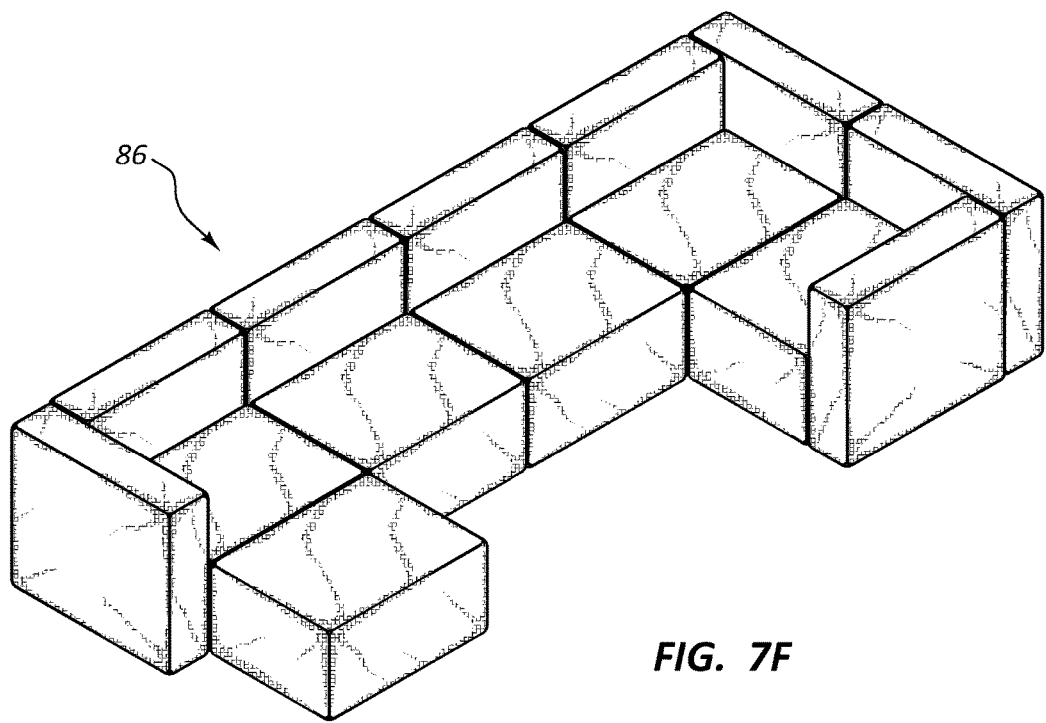
Figure 7G:
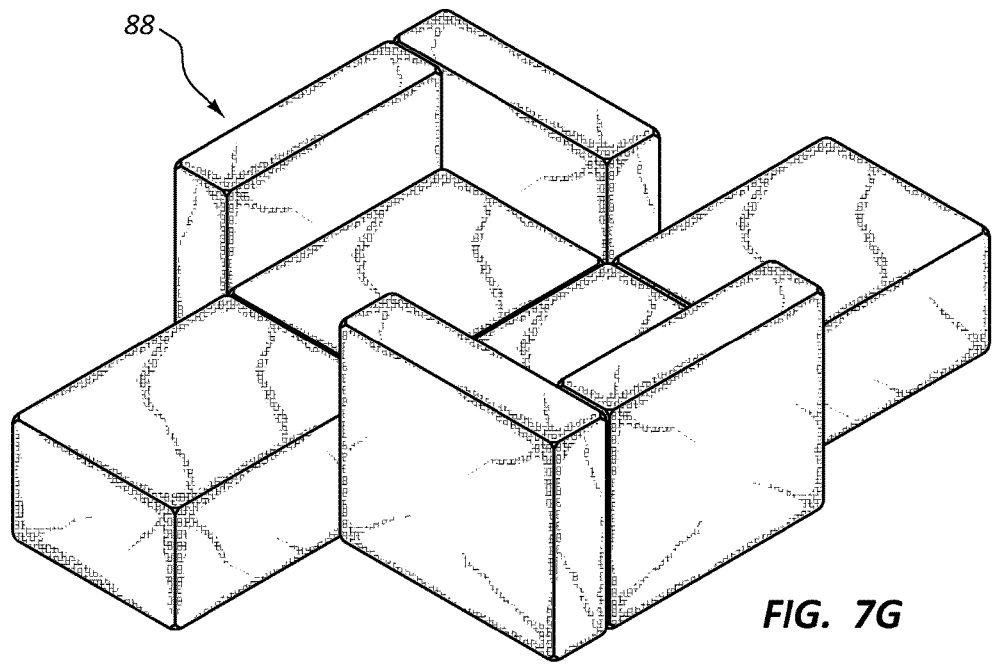
Figure 7H:
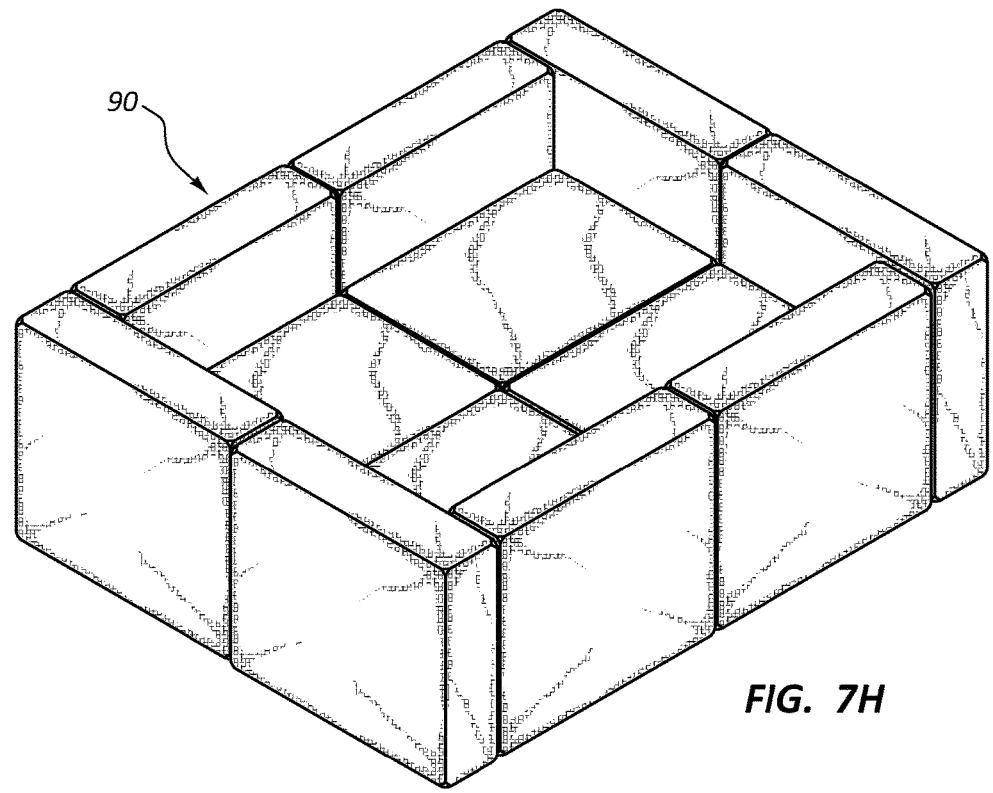
Figure 71:
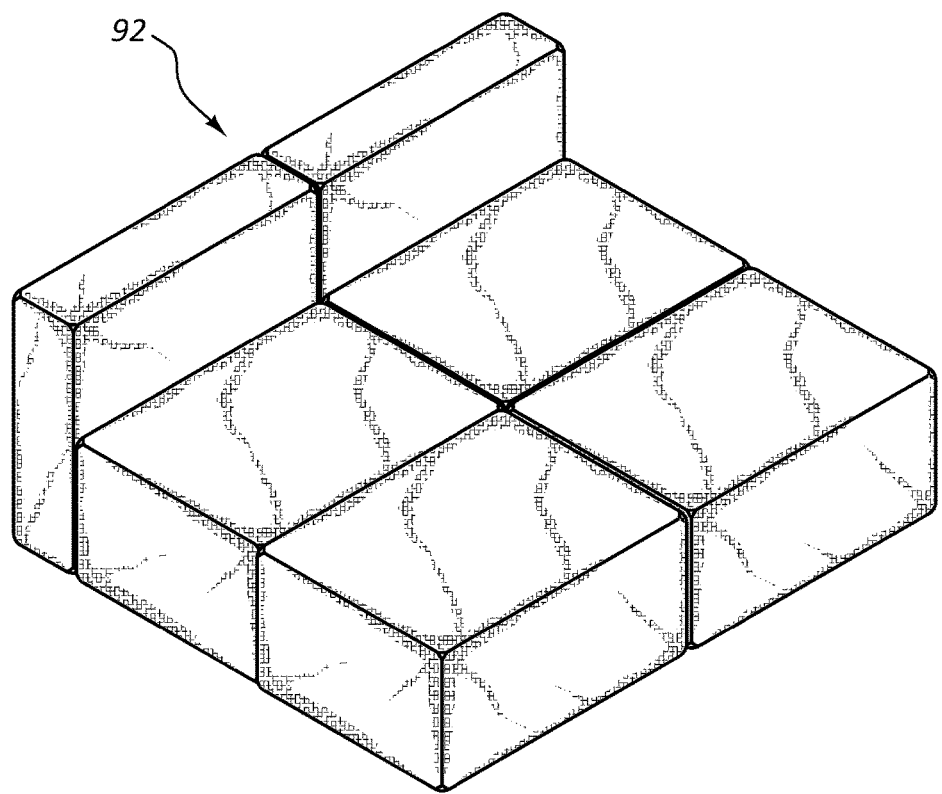

Thus, employing the magnetic coupling assembly of FIGS. 1A-5D, two bases 66 can be combined to form a couch-like structure of FIG. 7B, a chair can be formed as shown in FIG. 7C, a chaise may be formed as shown in FIG. 7D, a couch 84 (FIG. 7E) may be formed or a sectional 86, 88, (FIGS. 7F-7G) or crib 90 (FIG. 7H) may be formed as shown in the Figures. A bed 92 as shown in FIG. 7I may also be formed.

It is also possible to achieve additional positions by turning base(s) 66 upside down from the orientation shown in FIG. 6A and achieving additional relationships with other base(s) 66 and transverse member(s) 68.

In an embodiment, in which the assembly 64 is used for a modular furniture assembly for sitting and reclining, e.g., for toddlers or other children, the dimensions of the base 66 may be as follows: the length=about 19 inches, the height=about 8 inches, and the width=about 15 inches. In one such embodiment, the dimensions of transverse member 68 may be as follows: the length=about 19 inches, the height=about 20 inches, and the width=about 4 inches. Cushion members as described in conjunction with FIGS. 8A-8C may be provided, e.g., for placement over the base member. Such cushion members may have dimensions of: the length=about 19 inches, the width=about 15 inches, the height=about 2.5 inches. Such a cushion may simply be a fabric cover (e.g., inner and outer fabric covers) over a foam body. The foam of the cushion member may be of the same type as used for the base (e.g., less stiff, and more easily compressible than that used in the transverse member). The cushion member may not include any coupling mechanisms, but may simply be placed over the base member, hiding the VELCRO tabs extending laterally from the transverse members to provide dual coupling of the transverse members to the base member. Such an example is shown and described in conjunction with FIGS. 8A-8C. Such a cushion member may also be fabric over foam, although it may not include any rigid core.

In an embodiment, the metallic members and magnets for assembly 64 are each in the range of approximately 1 inch to approximately 1.5 inch in diameter. The magnets may be approximately ⅓ inch in thickness, and the metallic members may be approximately ⅛ inch in thickness, for example.

The base members 66 and/or transverse members 68 may be manufactured to be comprised of a foam body that is covered by an inner cover, which is covered by an outer cover (e.g., both fabric). The inner cover may comprise a non-woven fabric for example. The inner and outer covers may be zippered, to allow the contents to be easily placed therein, and then zipped closed. Other closures as will be appreciated by those of skill in the art are also possible (e.g., VELCRO, snaps, buttons, etc.). Such inner and outer covers permits removal and washing of the cover, as needed, which is beneficial. The magnets and/or metallic members may be secured within pockets in the inner cover, and may be tethered through such pockets to a rigid board or other rigid member at the core of the base member or transverse member, as described in further detail in conjunction with FIGS. 8A-17.

The magnets may be any suitable magnetic material (e.g., ferromagnetic magnets such as AlNiCo magnets, rare earth magnets, etc.). The attracted members may also be magnets, or may be non-magnetic metallic members that are magnetically attracted to a magnet, e.g., metal slugs comprising iron (e.g., steel), or another material that is magnetically attractable.

Figure 8A:
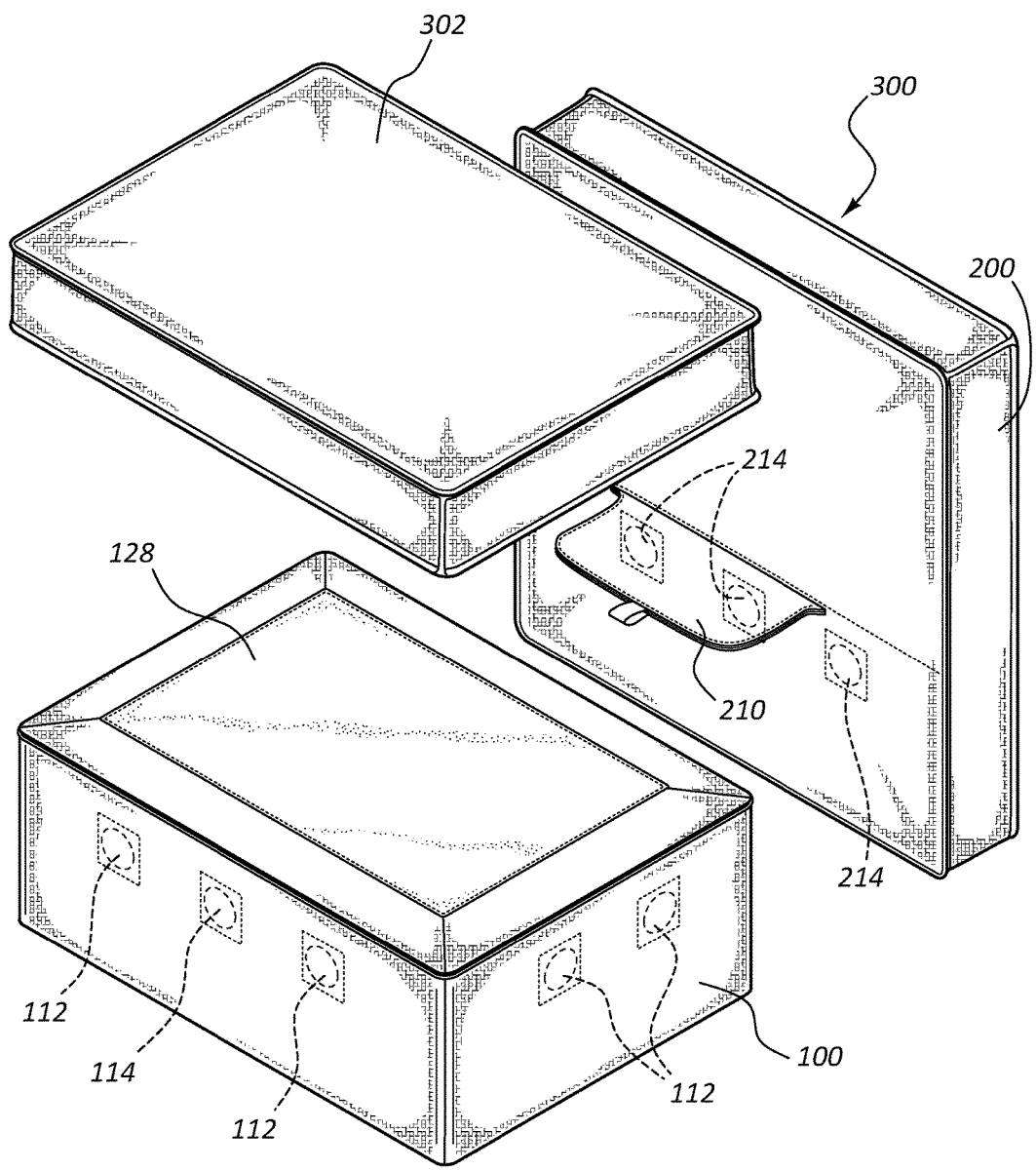
FIG. 8A shows a modular furniture assembly (e.g., a chair) in an exploded configuration, where the furniture assembly includes dual coupling mechanisms, e.g., a magnetic coupling mechanism and a mechanical coupling mechanism (e.g., VELCRO) for coupling the base member to the transverse member. A cushion member is also shown, exploded upwards. The transverse member is shown with a VELCRO tab for coupling to the top face of the base member, while magnets and/or attracted members are provided within the bottom portions of the base member and transverse member so as to be magnetically attracted to one another, coupling the bottom of the base member to the bottom of the transverse member.
Figure 8B:
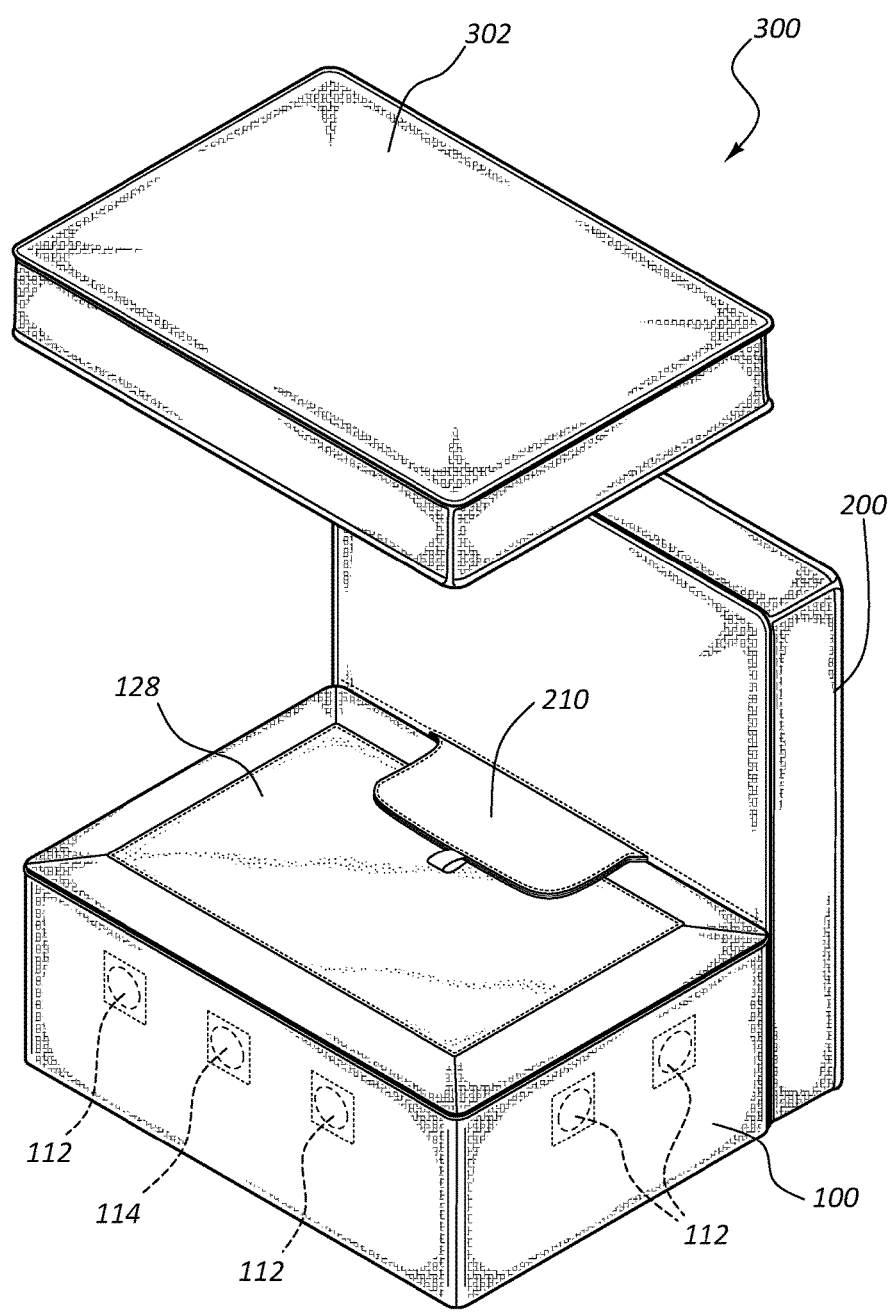
FIG. 8B shows the modular furniture assembly of FIG. 8A, where the transverse member and base member have been coupled to one another magnetically along a bottom portion of the transverse member and base member, and where the VELCRO tab of the transverse member has been coupled to the top face of the base member, providing dual coupling of the two members together.
Figure 8C:
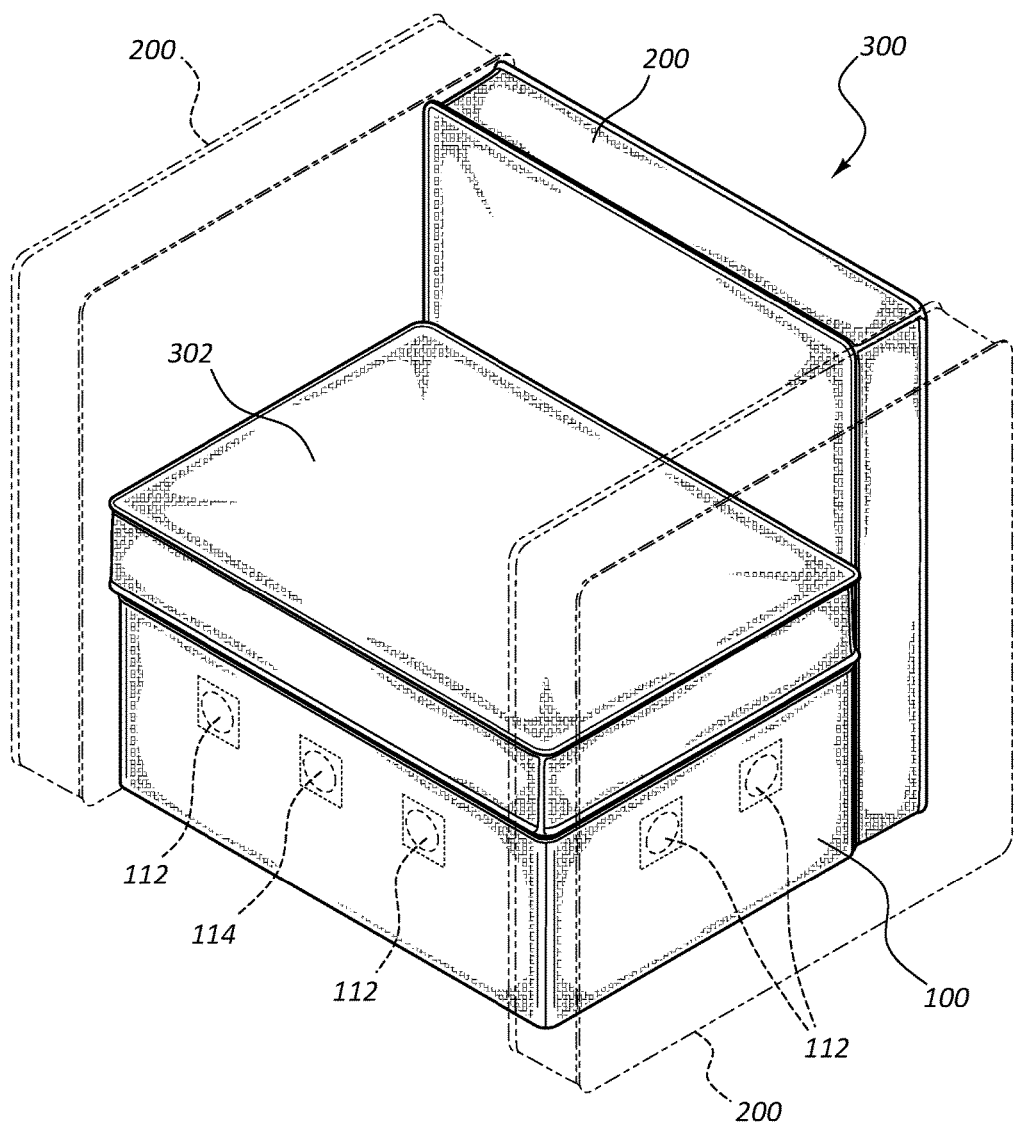
FIG. 8C shows the modular furniture assembly of FIG. 8B, where the cushion member has been lowered down onto the base member. Additional transverse members that could similarly be coupled to the base member (using dual coupling mechanisms) are shown in phantom.

FIGS. 8A-8C illustrate a modular furniture assembly 300, including a transverse member 200 positioned adjacent to base member 100, and a separate cushion member 302 may be positionable over base member 100. FIGS. 8A-8C illustrate how tab 210 of transverse member 200 secures the transverse member 200 to panel 128 of base member 100. Magnets 112 and/or attracted members 114, 214 within the bottom portions of the base member 100 and transverse member 200 also provide coupling of the base member with the transverse member.

As shown, the modular furniture assembly 300 may include upper and lower coupling mechanisms, e.g., an upper mechanical mechanism (e.g., VELCRO or other mechanical coupling tab 210), and a lower magnetic mechanism (e.g., magnets 112 and/or attracted members 114, 214). The lower magnetic mechanism may couple and secure the lower portion of the base member with the lower portion of the transverse member, while the upper mechanical coupling mechanism may secure the upper portion of the base member 100 with the mid-section of the transverse member 200.

FIG. 8C illustrates how additional transverse members 200 (shown in phantom) may be coupled to the sides of the base member 100, again, using the dual coupling mechanisms of a magnetically attracted coupling to couple the bottom portion of each transverse member to the bottom portion of the base member, and to mechanically couple (e.g., with VELCRO) the mid-section of the transverse member 200 to the top face of the base member 100. FIGS. 9A-10D show the base member 100 in more detail, while FIGS. 11-16C shows the transverse member 200 in more detail.

While described principally in the context of embodiments where the mechanical coupling mechanism (e.g., VELCRO) couples the top face of the base member 100 to a mid-section of the transverse member, it will be appreciated that other embodiments are of course possible. For example, the positions of the mechanical and magnetic coupling mechanisms could be reversed (e.g., magnetic coupling at top of base, mechanical coupling at bottom of base). For example, the VELCRO or other mechanical coupling mechanism could couple a bottom face of the base member to a bottom surface of the transverse member. The dual coupling mechanisms could be otherwise repositioned. For example, magnetic coupling could be provided on one side (e.g., left), and mechanical on another side (e.g., right), or vice versa. Two magnetic (and/or only magnetic—no mechanical), or two mechanical coupling mechanisms (and/or only mechanical—no magnets) could be provided, etc. Various other alternatives will be apparent to those of skill in the art in light of the present disclosure.

While other mechanical coupling or fastening mechanisms may be used, the illustrated configuration takes advantage of the particular properties of the hook and loop materials of VELCRO. For example, as shown, such a hook and loop coupling is much stronger when the tension force on the adjoining VELCRO panel is in a parallel direction versus simply pulling the VELCRO hook and loop panels apart from one another. For example, in the illustrated configuration, the shown horizontal orientation of the tab and panel causes the tab of the transverse member to drag across the panel of the base member when applying tension to pull the two apart. It is nearly impossible to pull the two apart when the tension force to pull them apart is parallel to the panel, as shown. This makes the coupling very strong, stabilizing the two members together. To separate the two, the tab must be pulled up (rather than laterally sideways).

The combination of this tactic on one edge (e.g., at the top, although it could be done at the bottom, or at the right, or at the left, etc.). and the magnets securing the opposite edge or end of the adjoining pieces provide for excellent attraction, joining, and stability using rather weak and traditionally temporary or transient attractive materials and coupling mechanisms. This is highly advantageous.

Such a dual coupling scheme can be employed to selectively couple together in a tight, stable manner not just the particularly illustrated base member and transverse member, but any conceivable modular furniture members (e.g., two base members, wedge shaped furniture members, arm rests, and others). Thus, broadly speaking, the dual magnetic and mechanical coupling mechanisms described principally in the context of the illustrated base member and transverse member could be used to join a base member to another base member, or any first member to any other second member. At one end or edge of the adjoining surfaces may be provided a magnetic coupling mechanism, while at another end or edge, may be provided a mechanical coupling mechanism (e.g., VELCRO or otherwise). For example, if a base member were shaped a bit differently from that illustrated (e.g., it had a backrest and/or armrest built into it), the dual coupling mechanisms could be used to couple such a base member to another base member, or any other desired member. The dual coupling mechanisms at opposed ends or edges provide great stability and reliability.

Such coupling mechanisms may be employed in any furniture assembly (e.g., for sitting on), such as couches, sectionals (e.g., straight sectional seating, cornered sectional seating, curved sectional seating, with wedge shaped members, and the like), of any conceivable configuration where it may be desired to releasably couple two members to one another, such that the illustrated base member and transverse member are merely explanatory. Such furniture assemblies may be configured for use as children's furniture, or full size furniture for supporting the weight and use typical of adults. The described coupling mechanisms may be suitably employed in any such conceivable environments.

Figure 9A:
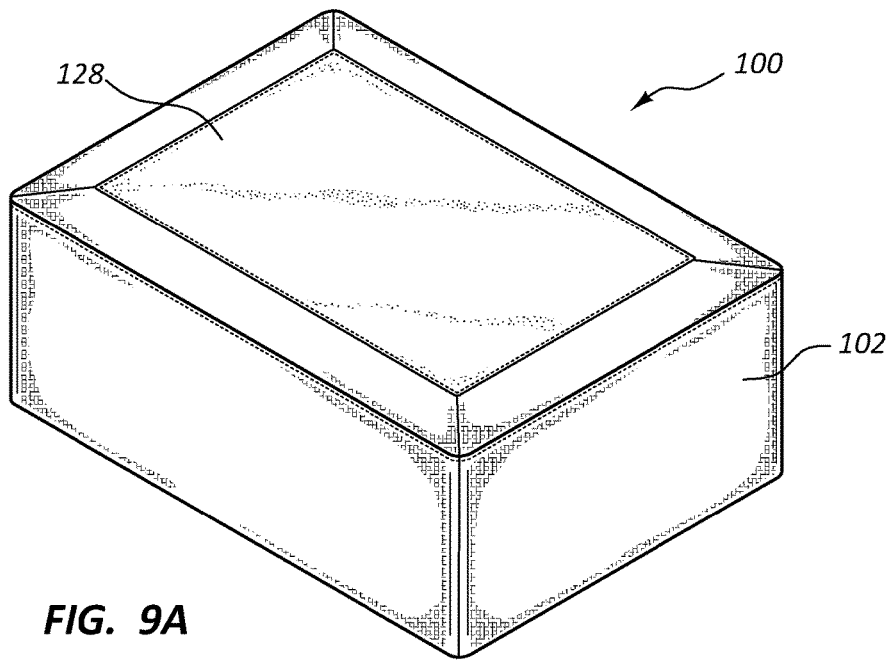
Figure 9B:
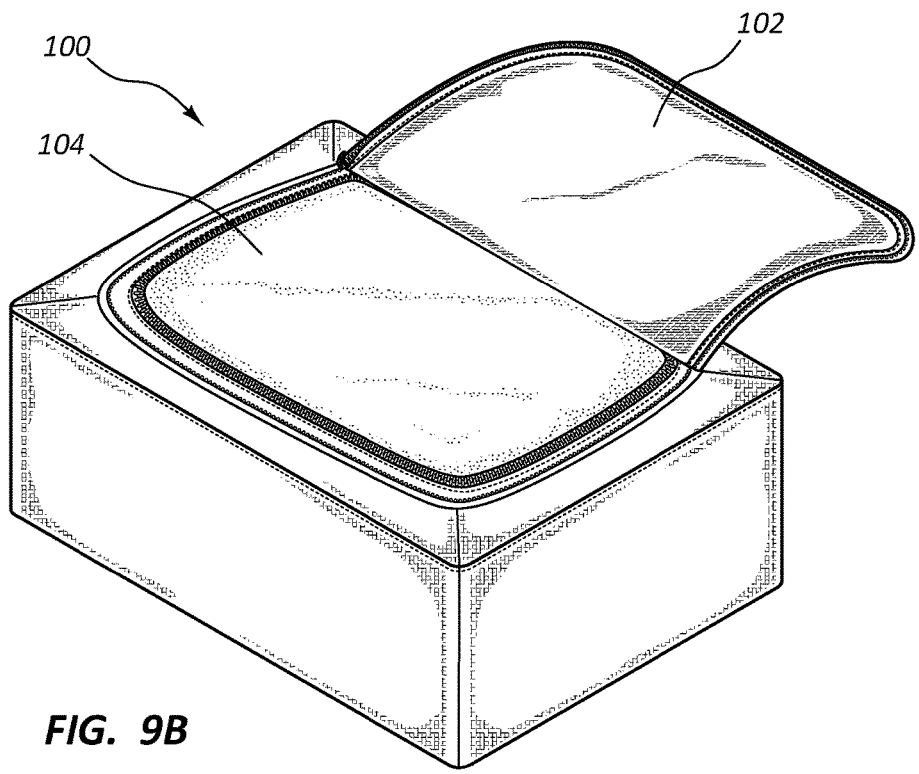
FIG. 9B shows the base member of FIG. 9A flipped over, and with the outer cover opened (e.g., unzipped).

FIGS. 9A-10D show an exemplary base member 100, which is shown as including an outer cover 102, an inner cover 104, an upper foam body 106, a rigid core 108, and a lower foam body 110. FIG. 9A shows the base member 100 top face up (with loop panel 128 positioned for coupling with hooks of tab 210 of transverse member 200). In FIGS. 9B and 10A, the base member 100 has been flipped upside down, showing a zippered bottom panel, with FIG. 10B showing the contents removed from inner cover 104. Because the base member has been flipped over, the lower foam body 110 is shown above the upper foam body 106 in FIG. 10B.

Inner and outer covers 102 and 104 may be fabric. Each may include a zippered opening as shown, to allow the contents to be easily placed therein, or removed, as needed (e.g., if it is desired to wash either or both fabric covers). The base member 100 as shown may thus be configured as fabric over foam, so that the entire exterior of the base member may be soft and comfortable. In other words, even with dual coupling mechanisms provided between the base member and the transverse member as described herein, no exterior rigid components are needed, providing soft cushioning characteristics across the entire exterior of both the transverse member 200 and the base member 100, with coupling mechanisms built into the transverse members and base members (so that no separate coupling mechanisms are required). Of course, relative harder constructions employing the disclosed coupling mechanisms are also possible (e.g., wicker or other cover wrapped over an aluminum or other relatively rigid skeleton).

Figure 10A:
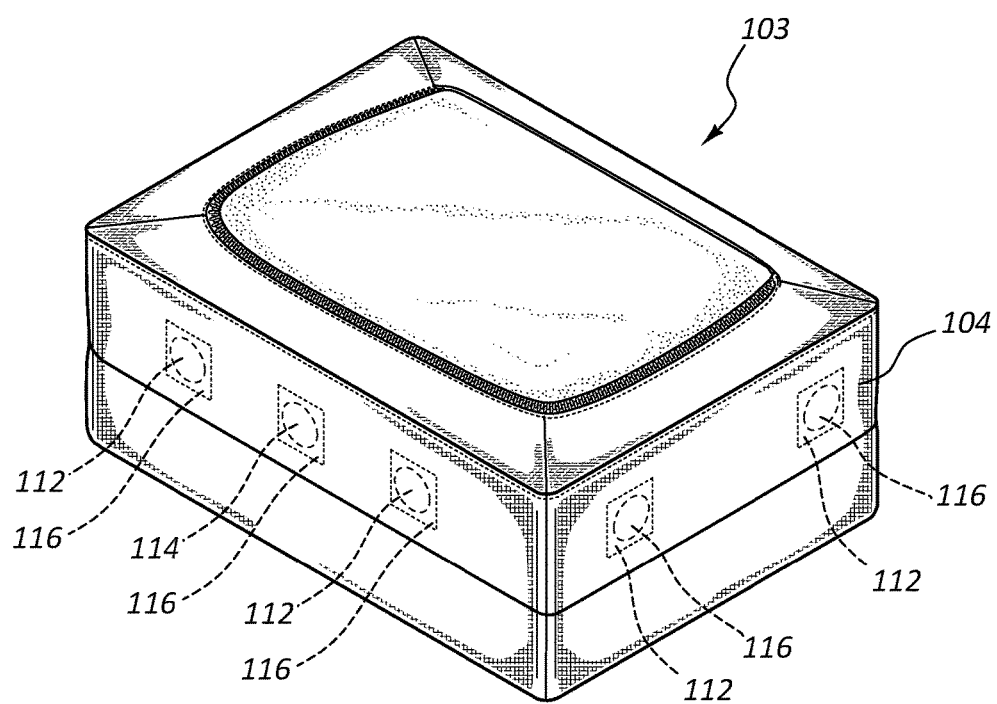
FIG. 10A shows the base member of FIG. 9A with the outer cover removed, better showing a fabric inner cover over a foam body and rigid core of the base member. The magnets and/or attracted members may be stitched into pockets of the inner cover, as shown.
Figure 10B:
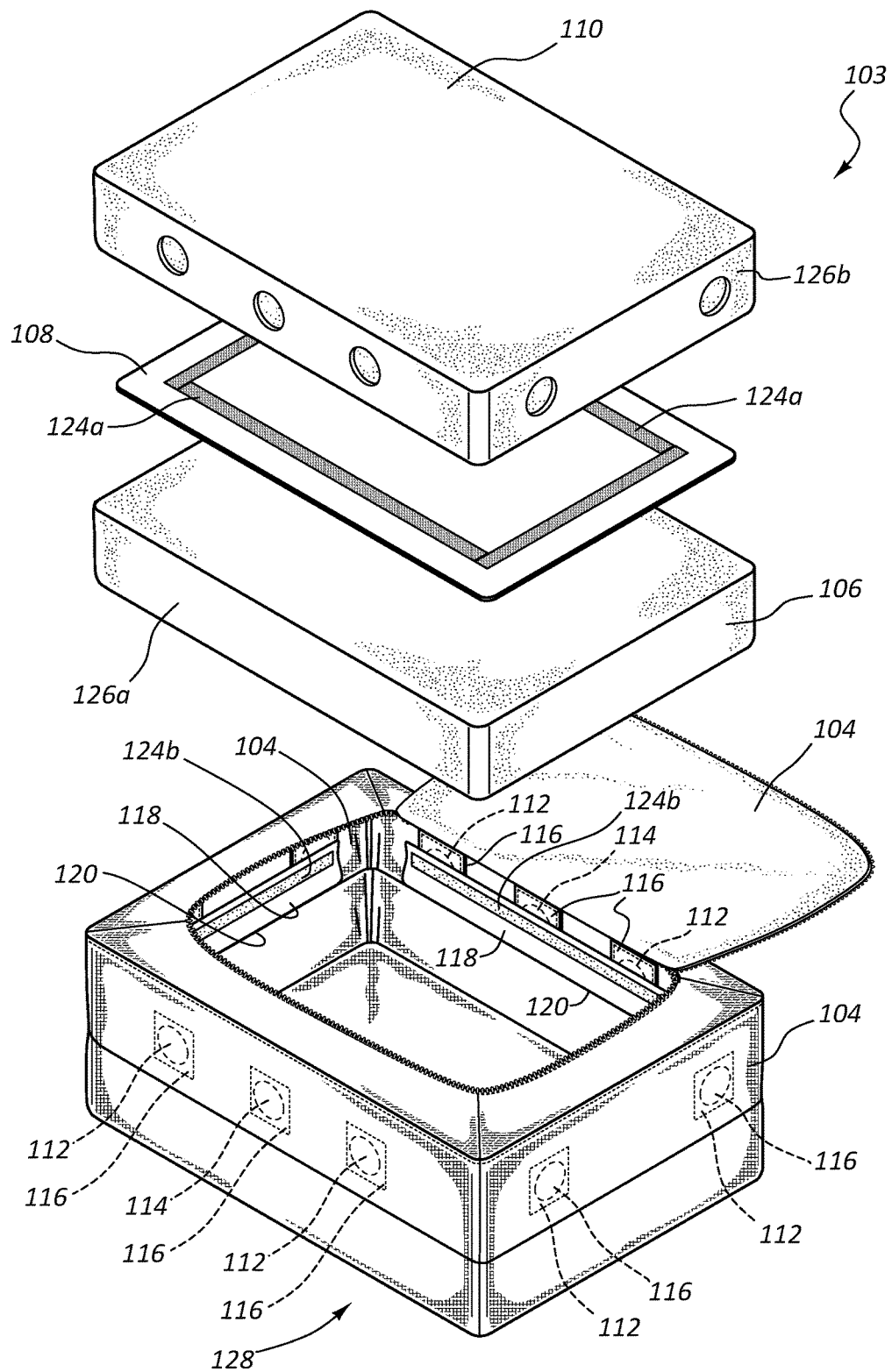
FIG. 10B shows an exploded view of the base member of FIG. 10A without the outer cover, illustrating the inner cover including pockets with magnets and/or attracted members positioned therein, the foam body or bodies, and the rigid core, which are placed into the inner cover.
Figure 10C:
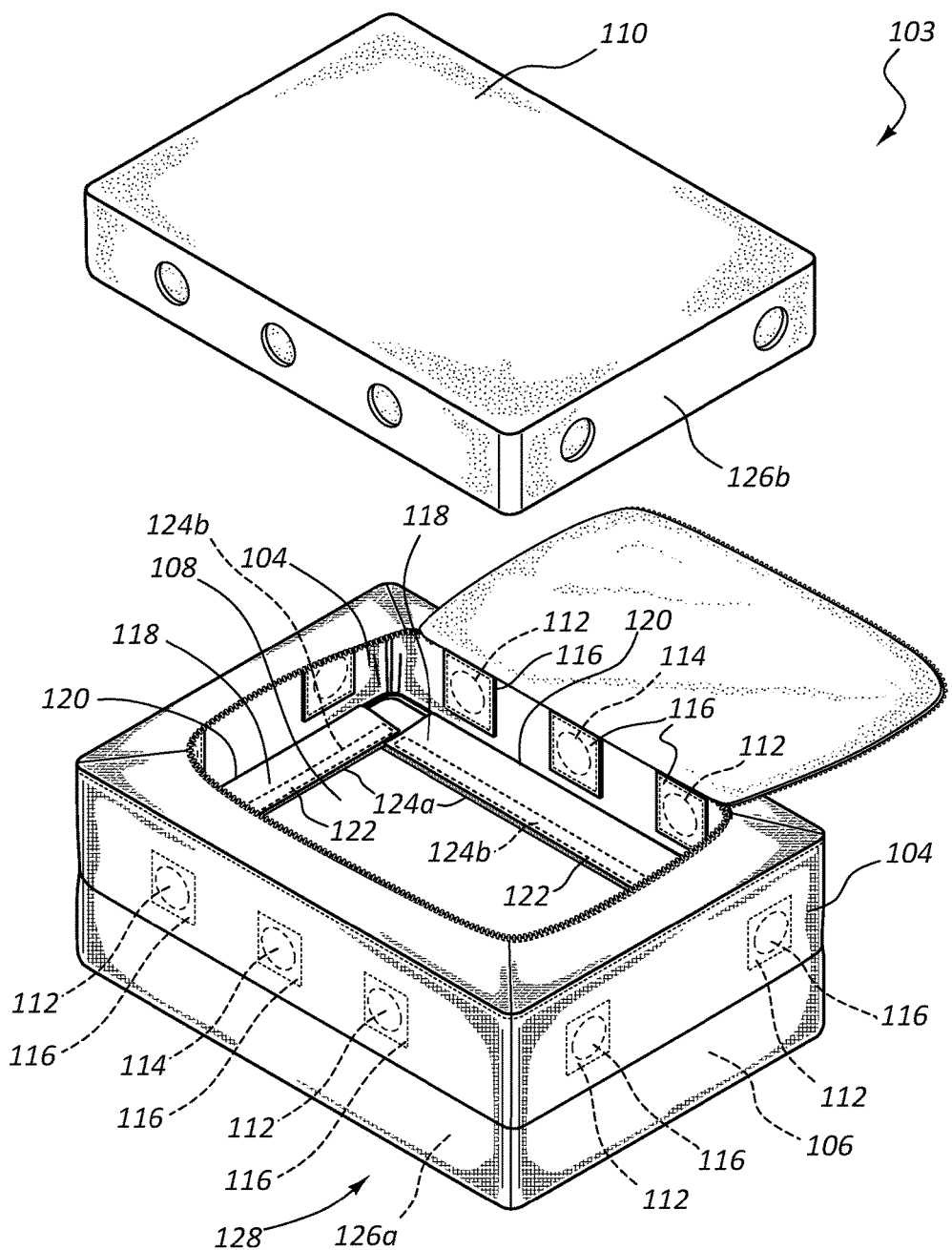
FIG. 10C is a partially assembled view of the structures of FIG. 10B, showing a mechanism by which the magnets and/or attracted members are tethered to the rigid core (and to one another) where the magnets are positioned in pockets provided in the inner cover, and tabs (e.g., fabric tabs) are attached (e.g., stitched) at one end to the inner cover at a location next to the pockets, and another end of the tabs are attached (e.g., using a hook and loop fastener such as VELCRO) to the rigid board or other rigid member at the core of the base member. Such construction tethers the magnets and/or attracted members to the rigid core and to one another (through the pockets, tabs and the rigid core). Such tethering limits the distance the magnets and/or attracted members may be pulled by a corresponding magnet or attracted member when a magnet and/or attracted member in the base member is brought in close proximity (sufficiently close for magnetic attraction to pull the two together) to a corresponding magnet and/or attracted member in the transverse member.

FIGS. 10A-10C show the inner cover 104 of base member 100, and its contents, labeled 103. As seen, magnets and/or attracted members 112, 114 may be stitched into pockets 116 of inner cover 104. Pockets 116 may simply comprise an additional fabric layer stitched to inner cover 104 (e.g., to the inside of inner cover 104), within which the magnets 112 and/or attracted members 114 are trapped. For example, a patch of additional fabric material may be stitched to inner cover 104, and magnet 112 or attracted member 114 may be inserted into the pocket 116 while at least one side thereof is open, and then the opening may be stitched closed, trapping magnets 112 and attracted members 114 in the desired pocket 116. Positioning of the magnets 112 and attracted members 114 (e.g., metallic slugs) about the perimeter of the base member and transverse member may be as described previously in conjunction with FIGS. 1A-5D.

Figure 10D:
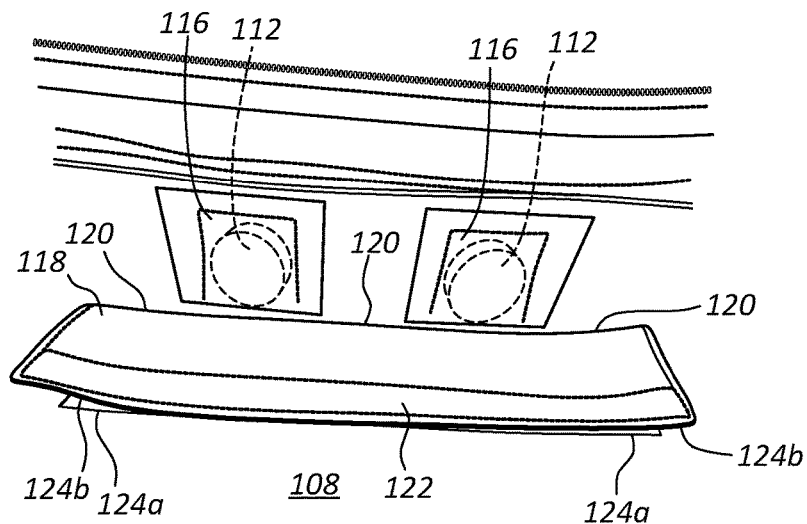
Figure 11:
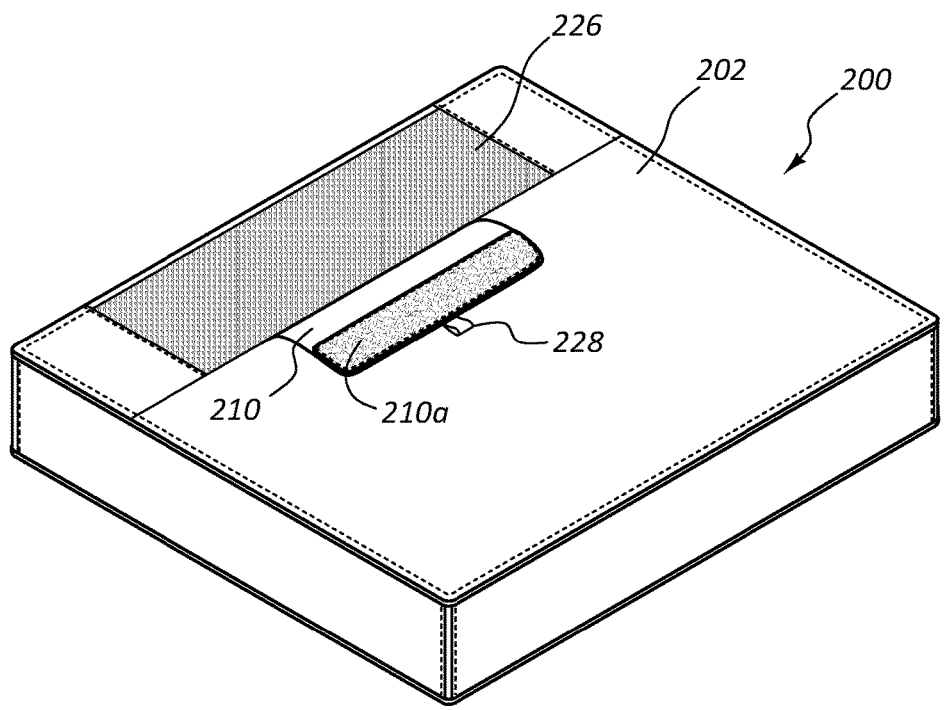

The pockets 116 (and thus magnets 112 and attracted members 114) may be tethered to rigid core 108, as perhaps best seen in FIGS. 10C-10D. Such tethering reduces the distance that the magnet or attracted member can be pulled outwardly when an attractive pulling force is applied to the magnet or attracted member by a corresponding magnet or attracted member in the transverse member. In other words, it reduces tenting of the fabric cover that would otherwise occur as such an attractive pulling force is applied to the magnet 112 or attracted member 114 in the pocket 116. As seen in FIGS. 10B-10D, this may be achieved by providing a tab 118 (e.g., a fabric tab), which tethers the inner cover 104 (e.g., at a location near pockets 116) to rigid core 108. An end of tab 118 may be stitched into fabric inner cover 104 at 120 (e.g., at or just below the bottom of pocket 116), while another end 122 of tab 118 is attached to rigid core 108, tethering magnets 112 and attracted members 114 in pockets 116 to rigid core 108. Such an arrangement reduces tenting of the fabric cover of the base member in the vicinity of the magnets and attracted members in the base member.

As illustrated, end 122 of tab 118 may be secured to rigid core 108 by VELCRO or another suitable attachment (e.g., rivets, screws, staples, adhesive, or the like). The VELCRO hook and loop attachment may be particularly advantageous as it is removable and repositionable, if such were needed. For example, rigid core 108 may have one portion 124a of the VELCRO (e.g., either the hook or loop) attached (e.g., stapled, riveted, adhesive, or other) around a perimeter of rigid core 108. The other portion 124b of the VELCRO (the other of the hook or loop) may be attached (e.g., stitched, or otherwise attached) to the free end 122 of fabric tab 118, allowing tab 118 to be stretched (e.g., pulled taut) and secured to rigid core 108.

Rigid core 108 may be disposed between upper and lower foam bodies 106, 110. Rigid core 108 may be attached to one or both of foam bodies 106, 110, as desired (e.g., with an adhesive). While rigid core 108 is shown as a board, it will be appreciated that any other suitable rigid, relatively inflexible material may be employed (e.g., rods, boards, and the like which provide an anchor for tethering).

FIG. 10D shows a close up view of a fabric tab 118, stitched into inner cover 104, at a location 120 near the bottom of pockets 116 (e.g., within an inch, within a half inch of the bottom of pockets 116). This Figure also shows how the free end of tab 118 may include one portion of the hook and loop fastener (e.g., the loop), while the other portion is attached (e.g., stapled, riveted, glued, or the like) to the rigid core 108, so that when tab 118 is pulled taut and pressed down onto rigid core 108, the strip of hook material (e.g., 124a, attached to the board 108) is aligned with the strip of loop material (e.g., 124b, attached to the underside of tab 118).

FIGS. 11-16C show an exemplary transverse member 200, which is shown as including an outer cover 202, an inner cover 204, a foam body 206 (see FIGS. 13-14), and a rigid core 208 at the core of the transverse member 200, about which board or other rigid member the foam body 206 is disposed. Foam body 206 may be attached to rigid core 208, e.g., by an adhesive or other suitable mechanism. The inner cover 204 may include pockets 216 with magnets and/or attracted members 214 disposed therein, in a similar manner as described above relative to base member 100. The pockets 216 and attracted members 214 may be disposed along a lower portion of transverse member 200, so as to be at a similar height, and aligned with magnets and/or attracted members 112, 114 of base member 100, so as to allow magnetic coupling of transverse member 200 to base member 100, as seen in FIGS. 8A-8C. FIG. 12A shows the outer cover 202 fully removed from the inner cover 204, while FIG. 12B shows the outer cover 202 only partially removed, with zippered flap 203 open.

The outer cover 202 of transverse member 200 is shown as including a tab 210, which forms a part of the mechanical coupling mechanism for coupling the transverse member 200 with the base member 100. Providing two coupling mechanisms, which perform through different principles (e.g., one being magnetic, the other mechanical), provides benefits in the ability to quickly orient the base member and transverse members as desired (magnetic coupling benefits), while providing increased robustness to the coupling (mechanical coupling benefit). Both coupling mechanisms advantageously may be included within the structure of the base member and transverse member, without sacrificing any optional fabric over foam, soft, cushioning characteristics of the entire exterior of both types of members, and without requiring separate, external coupling mechanisms (e.g., which may be lost, misplaced, etc.) where they are not permanently attached to the members.

The illustrated configuration includes a VELCRO tab 210 which extends laterally from a mid-section of transverse member 200. Tab 210 may advantageously be on the same face of transverse member 200 as pockets 216 including magnets and/or attracted members 214. For example, pockets 216 are shown near zippered bottom end of inner and outer covers 204 and 202. Tab 210 may include one portion of the hook and loop structure of such a mechanical coupling mechanism. For example, the hook portion 210a may be stitched or otherwise attached to the bottom facing face of tab 210, so as to engage the top surface of base member 100 (specifically panel 128 of loop material) when assembled, as seen in FIGS. 8A-8C.

For example, the top surface of outer cover 102 may include the loop portion of the VELCRO hook and loop coupling mechanism. In an embodiment, a panel 128 of such loop portion fabric material may be stitched into the outer cover on the top portion thereof. Such loop portion fabric material may be a different fabric from other parts, or the remainder of the outer cover of base member 100. For example, the remainder of the outer cover may be a woven or non-woven fabric that does not couple the hook portion of the VELCRO as well as the hook portion couples to the loop ("fuzzy") portion 128. Transverse member 200 may similarly include a panel 226 of loop portion fabric material on the outer cover 202, just below tab 210. When tab 210 is not being used to couple the transverse member to the base member 100, it may thus be folded over, and secured to the loop portion fabric material of panel 226. A loop 228 may be provided at the free end of tab 210, to facilitate easier loosening of tab 210 from panel 226 (or panel 128).

Transverse member 200 may include structure for reducing tenting of the fabric cover (e.g., outer cover 202) that would otherwise occur as a user pulls on tab 210. As shown in FIGS. 14A-14B and 16A-16C, an interior closure, such as an interior zipper 218 may be provided. Although described principally in the context of an interior zipper 218, it will be appreciated that other selective, reversible closure mechanisms may similarly be positioned (e.g., internally) to achieve a similar tethering effect. For example, such may include, but are not limited to VELCRO, snaps, and/or buttons. Such an interior zipper 218 may allow closure of the interior zipper 218, zipping the interior of the outer cover 202 to the exterior of the inner cover 204. For example, referring to FIGS. 16A-16B, a zipper portion 218a may be provided on the interior surface of outer cover 202, and another zipper portion 218b may be provided on the exterior surface of inner cover 204. Zipper portion 218a may be aligned with tab 210, so that one is on each side of the thickness of the fabric of outer cover 202. For example, tab 210 may be stitched to outer cover 202 with the stitching going into zipper portion 218a, providing a strong connection between tab 210 and zipper 218.

Figure 15A:
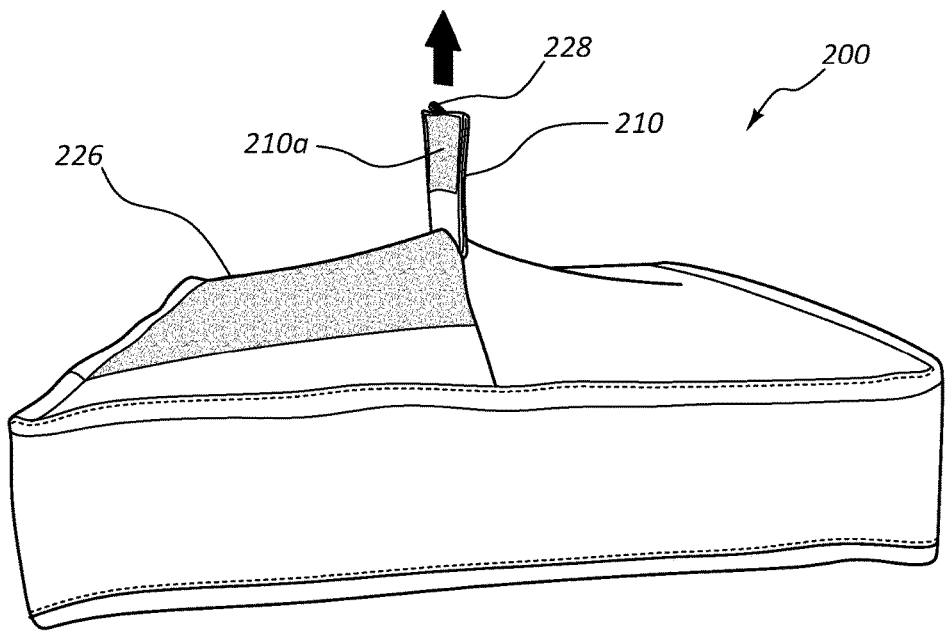
FIGS. 15A-15B show tenting of the outer cover that occurs when the interior closure (e.g., an interior zipper) is not closed (FIG. 15A) upon pulling the VELCRO tab on the outer cover as compared to tenting that occurs when the interior closure is closed (FIG. 15B). When the zipper is zipped, the zipper and strap tether the tab to the rigid core, limiting the distance the tab can be pulled.
Figure 15B:
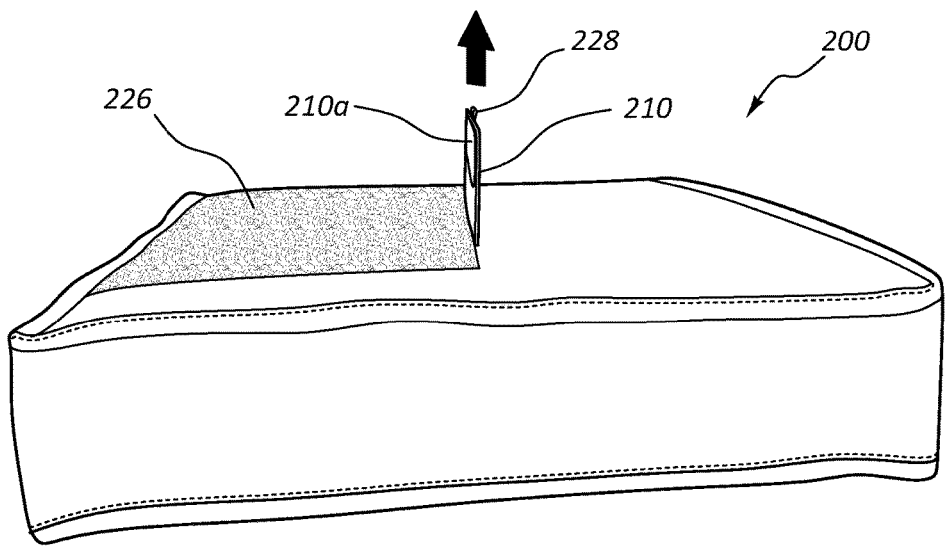
Figure 16A:
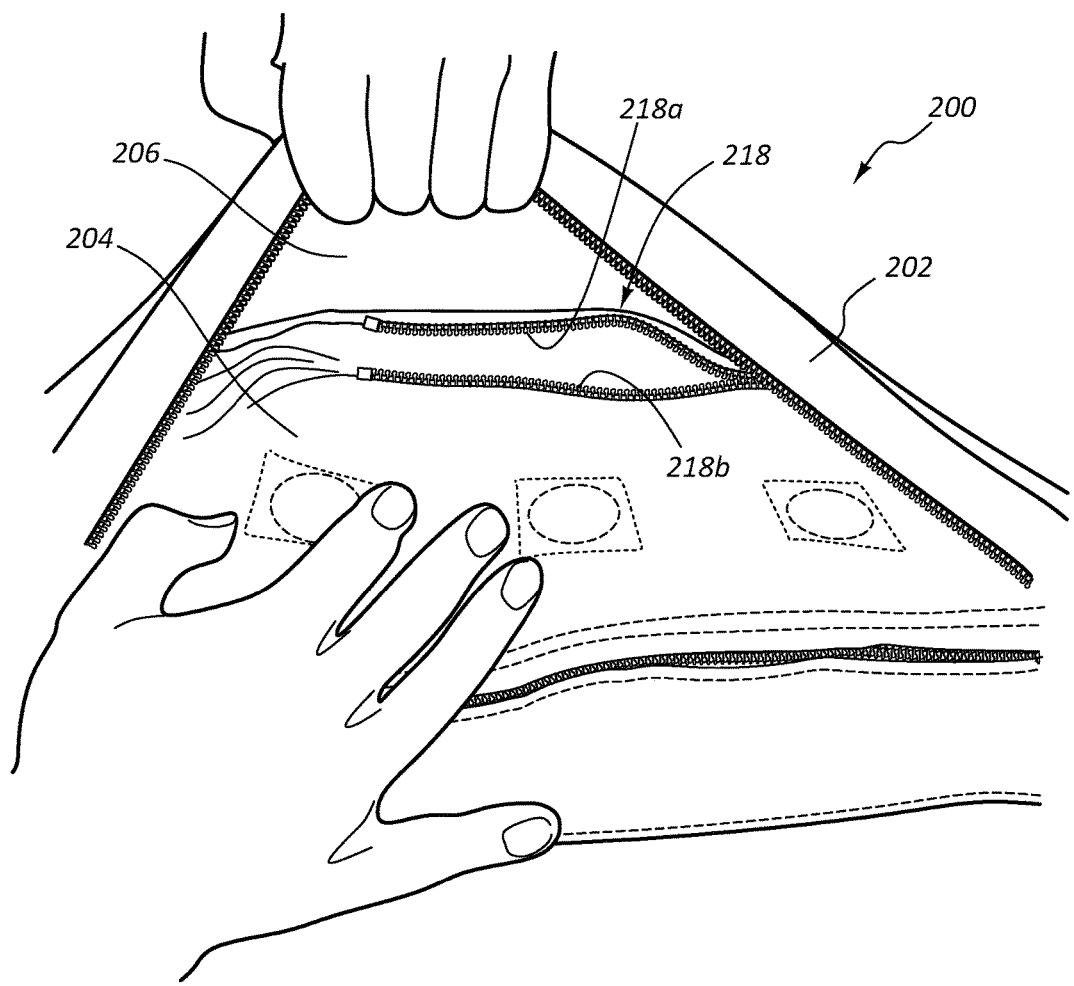
FIGS. 16A-16B show views into the unzipped outer cover, illustrating the interior closure (an interior zipper) in an open position (FIG. 16A) and a closed position (FIG. 16B).
Figure 16B:
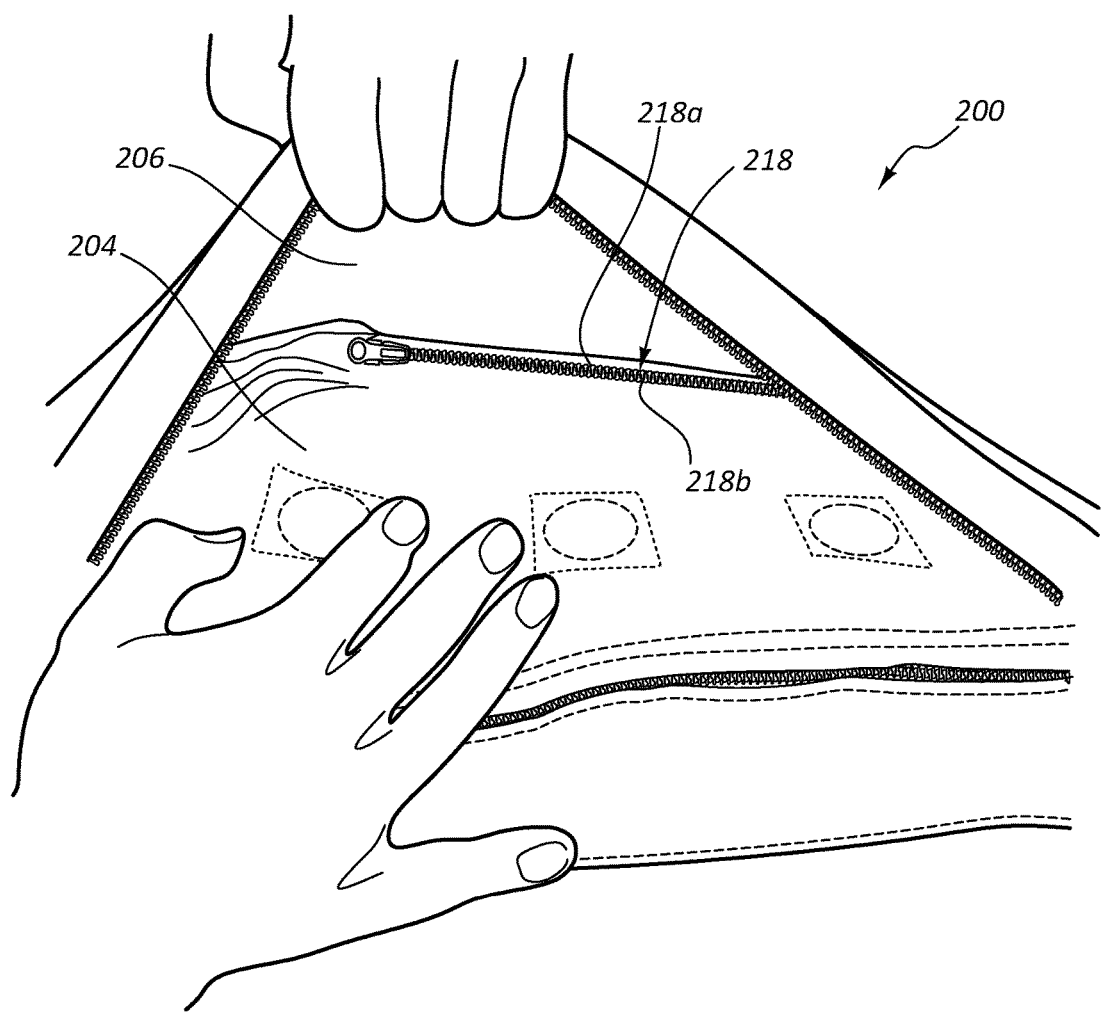
Figure 16C:
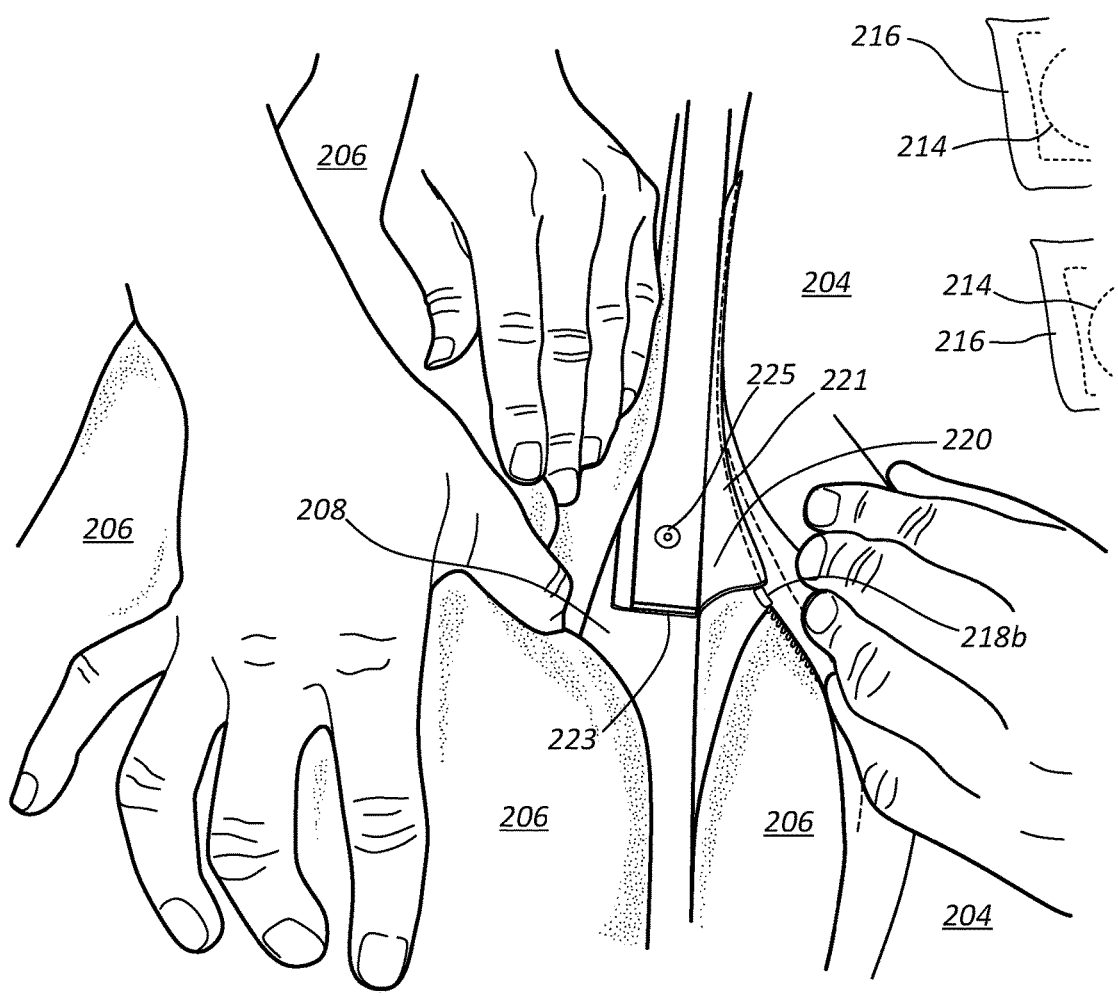

Zipper portion 218b may itself be stitched or otherwise attached into one side of an internal strap 220 (e.g., a strap formed of nylon strap, such as seat belt material). Strap 220 may be any of a wide variety of suitable materials or configurations for limiting "play" or "slack" in the tethered construction chain, so that the term "strap" as used herein is to be construed broadly. An example of internal strap 220 is perhaps best seen in FIGS. 16C and 14. FIG. 16C shows how one side 221 of the strap 220 may be stitched into zipper portion 218b, strongly connecting the two together. As seen in FIG. 16C, the opposite side 223 of strap 220 may be attached to rigid core 208. For example, side 223 may be glued, riveted, stapled, or otherwise attached to rigid core 208. An additional strip of tacking board or other member 208a may be provided as seen in FIG. 16C, sandwiching side 223 of strap 220 between board 208 and tacking board 208a. One or more rivets 225 may be provided therethrough, anchoring the strap in place. This provides a very strong tethered arrangement extending from rigid core 208, through strap 220, through zipper 218, to tab 210, limiting the distance that tab 218 can be pulled when zipper 218 is closed to minimize stretching or tenting that may otherwise occur as shown in FIGS. 15A-15B. FIG. 15A shows how stretching and tenting is possible when interior zipper 218 is not closed (FIG. 16A) as compared to the little or no tenting or stretching of FIG. 15B when interior zipper 218 is closed (FIG. 16B). Because of this arrangement, foam body 206 may not be readily removable from inner cover 204.

As zipper portion 218a may be aligned with tab 210, the end of strap 220 attached to inner cover 204 may be aligned with zipper portion 218b. As a result of such attachment, the interior zipper 218, tab 210, and strap 220 may all be aligned with one another, as perhaps best seen in FIGS. 14A-14B. When interior zipper 218 is closed, this tethers tab 210, through zipper 218 and strap 220, to rigid board 208.

Figure 12A:
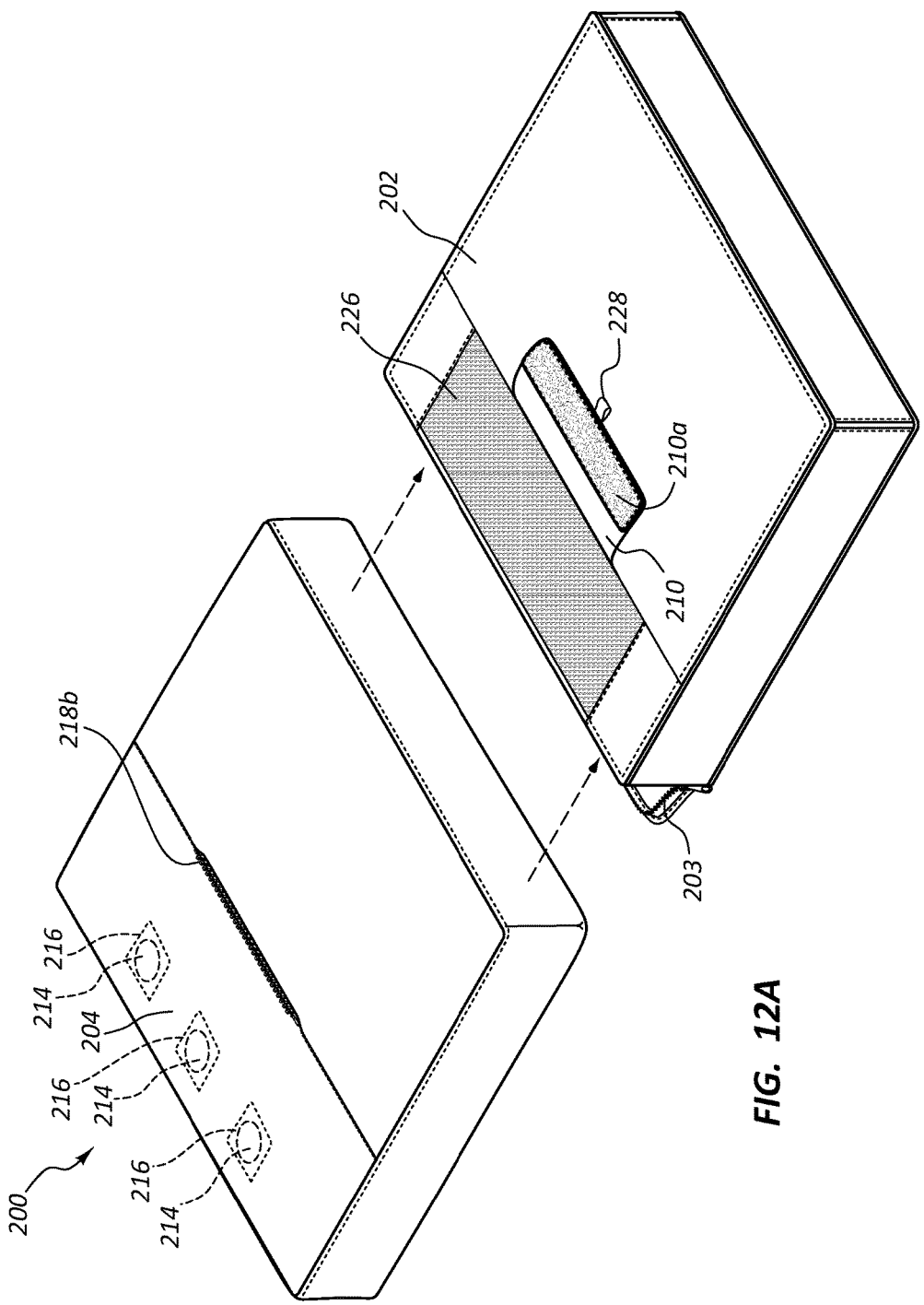
FIG. 12A shows the transverse member of FIG. 11 with the outer cover removed.
Figure 12B:
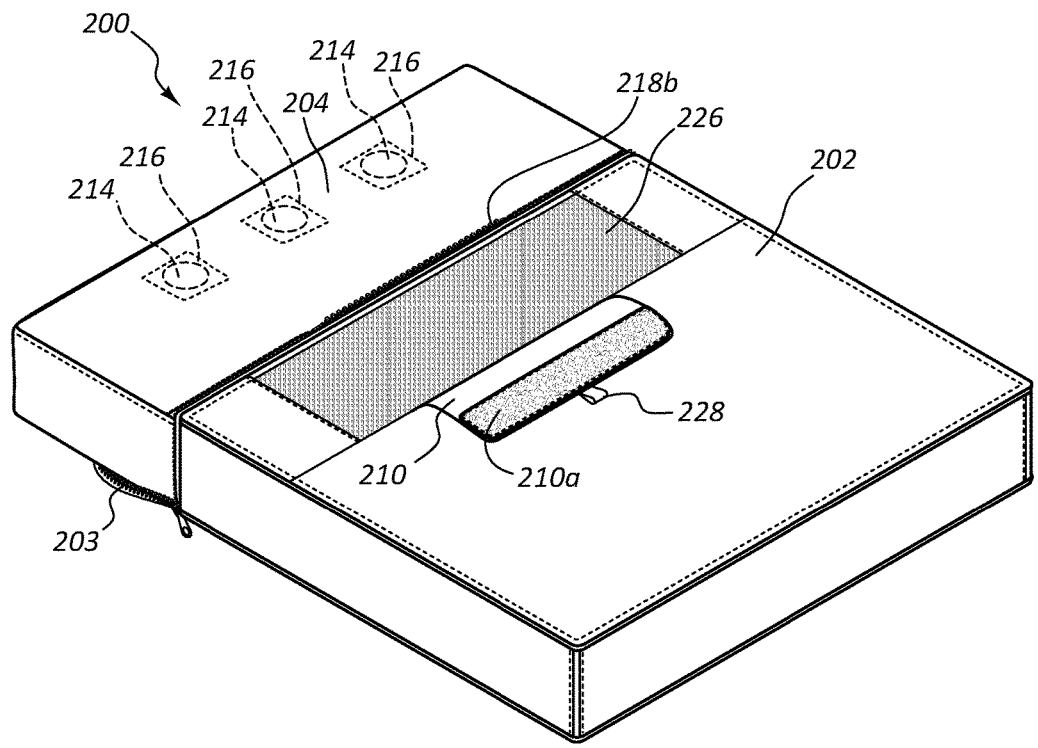
FIG. 12B shows the transverse member of FIG. 11 with the outer cover partially pulled over the remainder of the transverse member.
Figure 13:
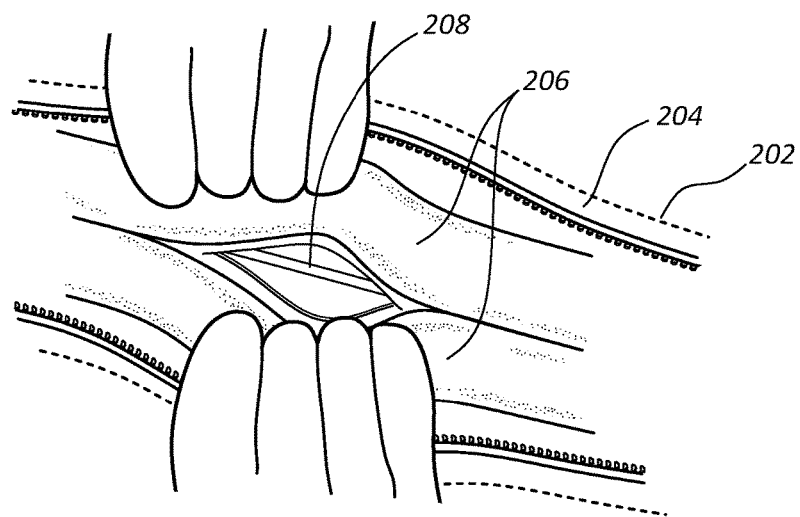
Figure 14A:
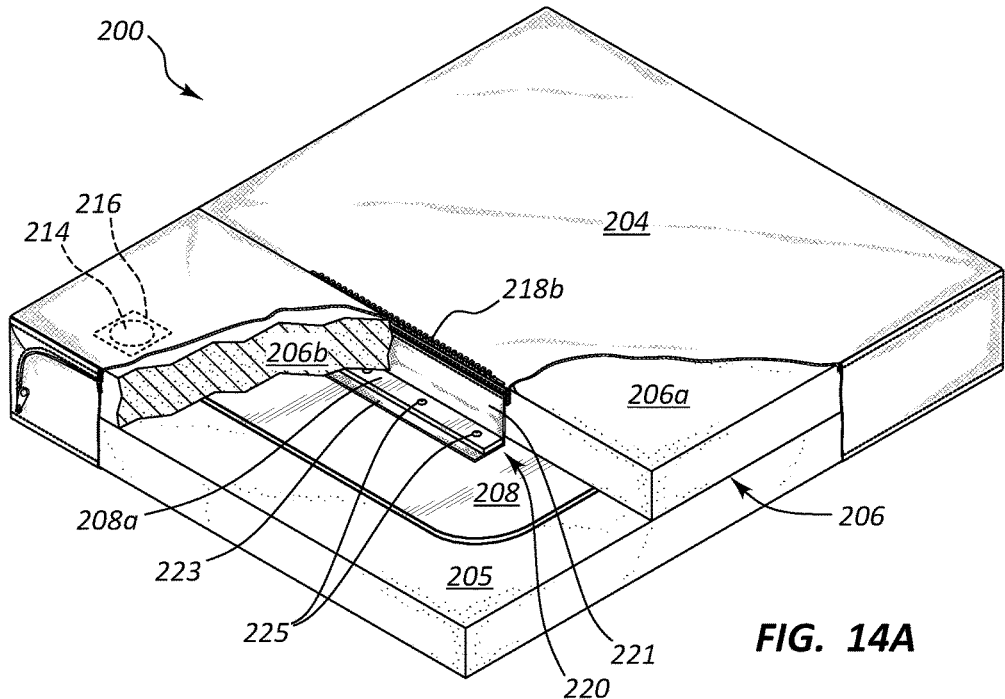
FIGS. 14A-14B show cut away views of the transverse member, illustrating the outer cover, the inner cover, the foam body, and the rigid core with various layers being cut-away in various locations to show certain internal features. Also shown is an interior closure (e.g., an interior zipper), which is provided between the inner and outer covers, for attaching the inner cover to the outer cover. The portion of the interior closure attached to the inner cover is attached (e.g., stitched) to a tethering strap (e.g., nylon), while an opposite side of the strap is attached to the rigid board core (e.g., glued, and/or riveted). The tab (e.g., VELCRO) is shown attached to (e.g., stitched into) the outer cover of the transverse member. The portion of the interior closure that is attached to the outer cover is attached (e.g., stitched) to a mid-section of the transverse member, aligned with the location where the VELCRO tab is attached to the outer cover. For example, the Velcro tab is attached to the outside of the outer cover, while the portion of the interior closure is attached at the same location, but on the inside of the outer cover. This configuration of the strap within the transverse member in combination with the interior closure tethers the VELCRO tab on the outer cover of the transverse member to the rigid core, limiting the distance that this tab can be pulled, reducing or preventing tenting of the outer cover upon pulling the tab.
Figure 14B:
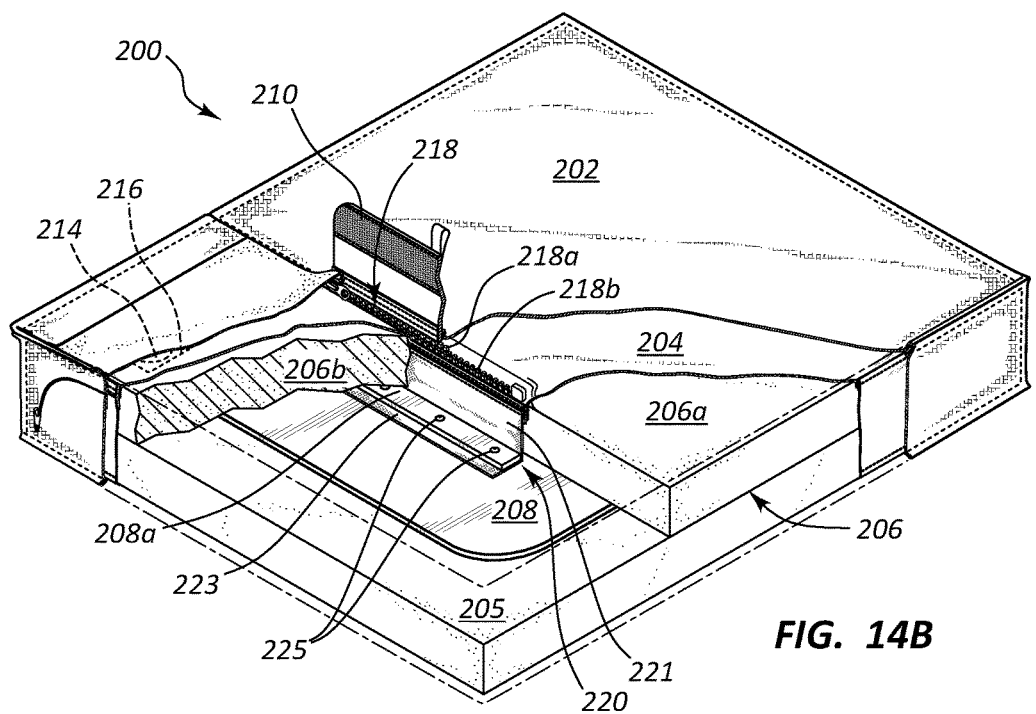

As seen in FIGS. 12A-12B, zipper portion 218b may be recessed, disposed within a crevice of transverse member 200. For example, the foam body 206 surrounding rigid core 208 may include multiple pieces of foam, with strap 220 being disposed between adjacent pieces of foam, as perhaps best seen in FIGS. 14A-14B. For example, one face of board 208 may be covered by foam body 205 (e.g., that face opposite where strap 220 and zipper portion 218b are attached). The other face of board 208 may include a foam body 206b disposed below strap 220, zipper portion 218, and tab 210. Another foam body 206a may be disposed above strap 220, zipper portion 218, and tab 210, with strap 220 disposed between the foam body pieces 206a and 206b. Strap 220 may be recessed below the top face of foam pieces 206a and 206b, so that when zipper portion 218b is stitched to strap 220, the zipper is generally perpendicularly oriented (e.g., horizontal) relative to the face (e.g., vertical) of the inner cover 204, and is recessed within the illustrated crevice; e.g., in an embodiment the zipper may be flush with the face of the inner cover 204. This anchors zipper portion 218b very tightly to the rigid board 208, minimizing any slack within the anchoring or tethering construction chain from the board to the zipper.

In an embodiment, the inner cover 204 may include two portions, as shown, below and above the location of the zipper portion 218b. At this location, the zipper portion 218b and strap 220 may be stitched into the inner cover, all four pieces together. For example, the stack of materials may include one of the inner cover portions, the zipper, followed by the other of the inner cover portions, followed by the strap 220, so that the zipper portion 218b is sandwiched between the two inner cover portions. As shown, the location of the zipper 218 and tab 210 may be within the lower half of the transverse member 200, e.g., with the zipper 218 and tab 210 at a location from about ⅓ to ½, or from about ⅓ to about ⅖ (40%) up from the bottom of the transverse member. Of course, the distance up from the bottom of the transverse member may be equal to the height of the base member, to engage therewith as seen in FIG. 8B.

Figure 17A:
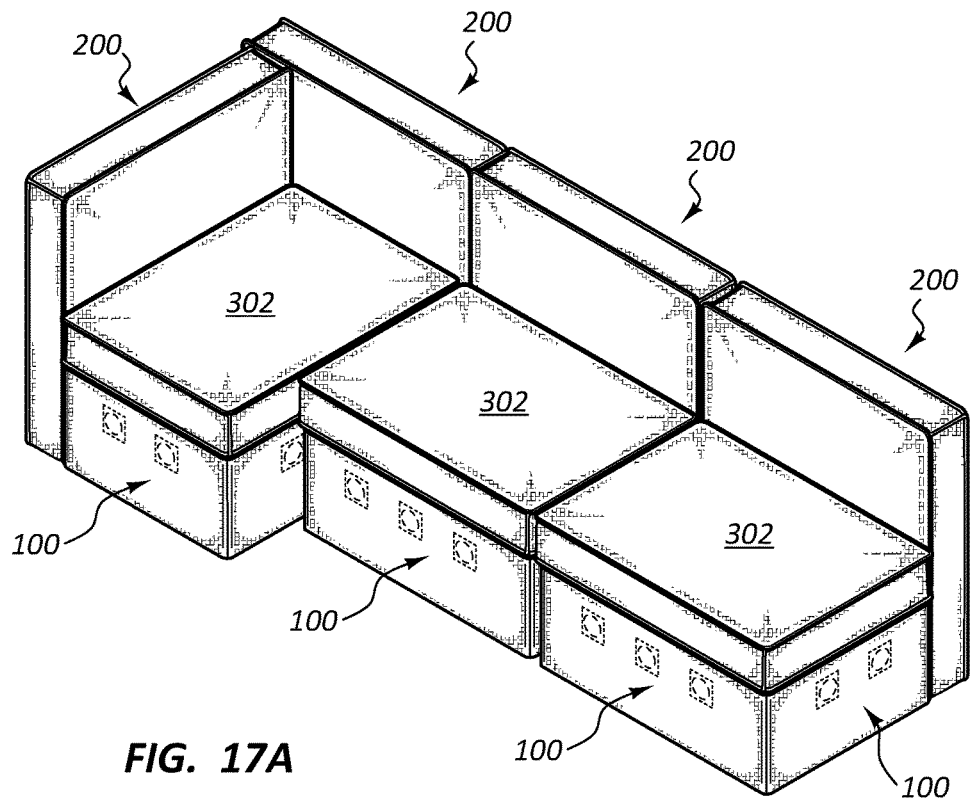
FIG. 17A-17B show exemplary modular furniture assemblies that can be assembled from a plurality of base members, a plurality of transverse members, and a plurality of cushion members for placement over the base members, where the transverse members and base members are coupled to one another using dual coupling mechanisms.
Figure 17B:
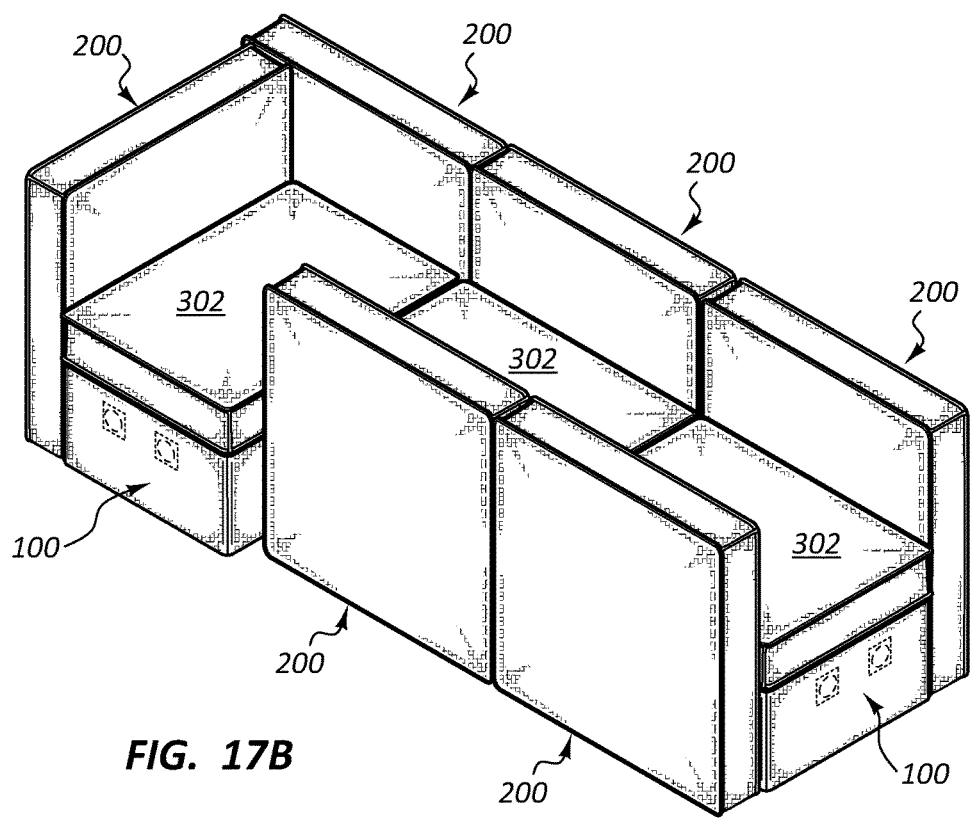

In addition to the modular furniture assembly 300 seen in FIGS. 8A-8C, it will be appreciated that any of the various furniture assemblies shown in 5A-7I may be assembled using base members and transverse members with dual coupling mechanisms. FIGS. 17A-17B illustrate additional possible arrangements.

Examples of a modular furniture assembly of the present invention are thus configured such that the furniture assembly can be selectively positioned into various selected positions, the furniture assembly comprising: (A) a first member (e.g., a base 100); and (B) a second member (e.g., a transverse member 200), wherein the first member 100 is: selectively, magnetically coupled to the second member 200; and selectively, mechanically coupled to the second member 200. The magnetic coupling assembly is configured to selectively, magnetically couple the first member 100 to the second member 200; and the mechanical coupling assembly is configured to selectively, mechanically couple the first member 100 to the second member 200. In one such embodiment, the first member comprises a base 100 and the second member comprises a transverse member 200.

The first member 100 is comprised of a first portion (e.g., 112, 114) of the magnetic coupling assembly and the second member 200 is comprised of a corresponding second portion (e.g., 214) of the magnetic coupling assembly; and the first member 100 is comprised of a first portion (e.g., 128) of the mechanical coupling assembly and the second member 200 is comprised of a corresponding second portion (e.g., 210) of the mechanical coupling assembly.

The portions of the magnetic coupling assembly are selected from the group consisting of magnets and metallic members; and wherein (ii) the portions of the mechanical coupling assembly are selected from the group consisting of: (A) a hook portion of a hook-and-pile (i.e., hook and loop) fastener; and (B) a pile portion of a hook and pile fastener.

In one embodiment, the portions of the magnetic coupling assembly are mounted to corresponding side portions of the first and second members (e.g., 100 and 200), and the portions of the mechanical coupling assembly are mounted to corresponding portions of (A) a top portion 128; and (B) a flap 210, respectively, of the first and second members. In another embodiment, the components of the mechanical coupling assembly are mounted in corresponding side portions of the first and second members; and (ii) the components of the magnetic coupling assembly are mounted in corresponding portions of: (A) a top portion; and (B) a flap, respectively, of the first and second members.

The second member 200 may comprise an inner portion and a cover (e.g., 202, 204) covering the inner portion, the flap 210 of the second member being connected to an outside portion of the cover 202, wherein a connection assembly attached to an inside portion of the cover adjacent the flap connects the cover to the inner portion of the second member.

The inner portion of the second member may be comprised of a rigid core plate (e.g., 208) encapsulated by a cushion material (e.g., 206a, 206b, 205), the rigid core plate 208 having a first portion (e.g., 220) of the connection assembly attached thereto, the cover having a second portion of the connection assembly attached thereto (e.g., 218a, 218b), wherein the first portion 220 of the connection assembly is selectively coupled to the second portion 218a, 218b of the connection assembly. The connection assembly may comprise a two-part zipper assembly, one part (e.g., 218a) of the zipper assembly being mounted inside the cover and the corresponding second part (e.g., 218b) of the zipper assembly being mounted to the inner portion of the second member.

A modular furniture assembly of the present invention is thus configured, in one embodiment, such that the furniture assembly can be selectively positioned into various selected positions, the furniture assembly comprising: (i) a first member (such as a base member 100); (ii) a second member (such as a transverse member 200); (iii) a magnetic coupling assembly comprising corresponding components that are magnetically attracted to one another (e.g., magnets attracted to metallic members); and (iv) a mechanical coupling assembly having mechanical components that are mechanically coupled to each other (e.g., VELCRO hook-and-pile fastener components).

In one embodiment of this furniture assembly of the present invention: (A) the first (e.g., base) member has a portion of the magnetic coupling assembly (e.g., a magnet 112), and (B) the second (e.g., transverse) member has another portion of the magnetic coupling assembly (e.g., a metallic member 214), the magnetic coupling assembly being configured to selectively orient the first (e.g., base) member 100 and the second (e.g., transverse) member 200 into desired positions and to selectively, removably couple the first (e.g. base) member 100 to the second (e.g., transverse) member 200, such that the first (e.g., base) member and the second (e.g., transverse) member are magnetically attracted to each other, wherein components of the magnetic coupling assembly are selected from the group consisting of magnets (e.g., 112) and metallic members (114, 214); and furthermore (C) the first (e.g, base) member 100 has a portion of the mechanical coupling assembly (e.g., VELCRO hook portion), and (B) the second (e.g., transverse) member 200 has another portion of the mechanical coupling assembly (e.g., VELCRO pile portion), the mechanical coupling assembly being configured to selectively, removably couple the first (e.g. base) member 100 to the second (e.g., transverse) member 200.

In one embodiment, corresponding components of the magnetic coupling assembly comprise a plurality of magnets (e.g., 112) and a plurality of metallic members (e.g., 114, 214) that are attracted to the plurality of magnets (e.g., 112). In an embodiment, corresponding components of the magnetic coupling assembly comprise magnets that are spaced in an alternating polar relationship. The corresponding components of the magnetic coupling assembly are disposed within the respective base and transverse members 100, 200. The base member and the transverse member are attracted to each other when they are placed in sufficient proximity to each other and such that the base member and the transverse member are selectively oriented into certain desired positions.

EXEMPLARY EMBODIMENTS OF THE INVENTION

Embodiments of the invention thus include a modular furniture assembly configured such that the furniture assembly can be selectively positioned into various selected positions, the furniture assembly comprising:

a first member including a cover over a body which includes a rigid core;

a second member including a cover over a body which includes a rigid core;

a coupling mechanism that is a magnetically attractive coupling mechanism and/or a mechanical coupling mechanism for selectively, removably coupling the first member to the second member; and the coupling mechanism including a first member portion thereof mounted to a portion of the first member and a second member portion thereof mounted to a portion of the second member;

wherein the first member portion of the coupling mechanism is tethered to the rigid core of the first member, and/or the second member portion of the coupling mechanism is tethered to the rigid core of the second member to reduce tenting of the cover of the first member and/or the second member as the first member portion of the coupling mechanism and the second member portion of the coupling mechanism are pulled apart from one another after being coupled;

wherein the covers of the first member and the second member are fabric covers, each including an inner cover and an outer cover;

wherein the coupling mechanism includes the mechanical coupling mechanism, which mechanical coupling mechanism comprises a hook and loop coupling mechanism, wherein the second member coupling portion comprises hook or loop material disposed on a tab which extends laterally from the second member, and the first member coupling portion comprises the other of the hook or loop material on a corresponding surface of the first member, so that the hook or loop of the tab engages the hook or loop material of the corresponding surface of the first member when the second member is coupled to the first member;

wherein the tab extending laterally from the second member further comprises a loop at a free end of the tab to facilitate easier loosening of the tab once coupled.

Another embodiment may be directed to a modular furniture assembly as in the paragraph above, wherein the corresponding surface of the first member comprises the loop or hook material, and the tab extending laterally from the second member comprises the other of the loop or hook material.

Another embodiment may be directed to a modular furniture assembly as recited in the paragraph above, wherein the second member further comprises a panel of loop or hook material below the tab extending laterally from the second member, so that the tab can be stowed over the panel, coupled to the loop or hook material of the panel when not in use.

Another embodiment may be directed to a modular furniture assembly as recited, wherein the modular furniture assembly further comprises a cushion member including a fabric cover over a foam body, the cushion member not including any rigid core about which the foam body is disposed.

Another embodiment may be directed to a modular furniture assembly configured such that the furniture assembly can be selectively positioned into various selected positions, the furniture assembly comprising:
 a first member; and
 a second member,
 wherein the first member is:
  selectively, magnetically coupled to the second member; and
  selectively, mechanically coupled to the second member.

Another embodiment may be directed to a modular furniture assembly as recited in the paragraph above, wherein:
 (i) a magnetic coupling assembly is configured to selectively, magnetically couple the first member to the second member; and
 (ii) a mechanical coupling assembly is configured to selectively, mechanically couple the first member to the second member.

Another embodiment may be directed to a modular furniture assembly as recited in the paragraph above, wherein (i) the first member is comprised of a first portion of the magnetic coupling assembly and the second member is comprised of a corresponding second portion of the magnetic coupling assembly; and wherein (ii) the first member is comprised of a first portion of the mechanical coupling assembly and the second member is comprised of a corresponding second portion of the mechanical coupling assembly.

Another embodiment may be directed to a modular furniture assembly as recited in the paragraph above, wherein (i) the portions of the magnetic coupling assembly are selected from the group consisting of magnets and metallic members; and wherein (ii) the portions of the mechanical coupling assembly are selected from the group consisting of: (A) a hook portion of a hook-and-loop fastener; and (B) a loop portion of a hook and loop fastener.

Another embodiment may be directed to a modular furniture assembly as recited in the paragraph above, wherein (i) the portions of the magnetic coupling assembly are mounted to corresponding side portions of the first and second members; and (ii) the portions of the mechanical coupling assembly are mounted to corresponding portions of (A) a top portion; and (B) a flap, respectively, of the first and second members.

Another embodiment may be directed to a modular furniture assembly as recited in the paragraph above, wherein the second member comprises an inner portion and a cover covering the inner portion, the flap of the second member being connected to an outside portion of the cover, wherein a connection assembly attached to an inside portion of the cover adjacent the flap connects the cover to the inner portion of the second member.

Another embodiment may be directed to a modular furniture assembly as recited in the paragraph above, wherein the inner portion of the second member is comprised of a rigid core plate encapsulated by a cushion material, the rigid core plate having a first portion of the connection assembly attached thereto, the cover having a second portion of the connection assembly attached thereto, wherein the first portion of the connection assembly is selectively coupled to the second portion of the connection assembly.

Another embodiment may be directed to a modular furniture assembly as recited in the paragraph above, wherein the connection assembly comprises a two-part zipper assembly, one part of the zipper assembly being mounted inside the cover and the corresponding second part of the zipper assembly being mounted to the inner portion of the second member.

Another embodiment may be directed to a modular furniture assembly as recited in the paragraph above, wherein the first member comprises a base and the second member comprises a transverse member.

Another embodiment may be directed to a modular furniture assembly as recited any of the paragraphs above, wherein (i) the components of the mechanical coupling assembly are mounted in corresponding side portions of the first and second members; and (ii) the components of the magnetic coupling assembly are mounted in corresponding portions of: (A) a top portion; and (B) a flap, respectively, of the first and second members.

Another embodiment may be directed to a modular furniture assembly configured such that the furniture assembly can be selectively positioned into various selected positions, the furniture assembly comprising:
 a base member;
 a transverse member comprising a rigid board core encapsulated by three pieces of foam, including a first piece of foam on one face of the rigid board core, and the second and third pieces of foam being on the opposite face of the rigid board core;
 dual coupling mechanisms including a lower magnetically attractive coupling mechanism and an upper mechanical coupling mechanism for selectively removably coupling the base member to the transverse member wherein:
  the lower magnetically attractive coupling mechanism comprises corresponding components that are magnetically attracted to one another, a portion of which components are mounted to a lower portion of the base member, another portion of which components are mounted to a lower portion of the transverse member, the lower magnetically attractive coupling mechanism being configured to selectively orient the base member and the transverse member into desired positions; and
  the upper mechanical coupling mechanism is disposed above the lower magnetically attractive coupling mechanism, and comprises a base member mechanical coupling portion mounted to a portion of the base member and a transverse member mechanical coupling portion mounted to a portion of the transverse member, which base member mechanical coupling portion and transverse member mechanical coupling portion can be selectively engaged with one another to couple the base member to the transverse member, reducing movement of a top portion of the transverse member relative to the base member;

wherein the transverse member mechanical coupling portion of the upper mechanical coupling mechanism includes a strap attached to the rigid board core of the transverse member, which strap is attached to a first zipper portion of an interior zipper, the strap and first zipper portion being disposed between the second and third pieces of foam.

Another embodiment may be directed to a modular furniture assembly configured such that the furniture assembly can be selectively positioned into various selected positions, the furniture assembly comprising:
 a first member;
 a second member;
 dual coupling mechanisms including a magnetically attractive coupling mechanism positioned at a first location and a mechanical coupling mechanism positioned at a second location for selectively removably coupling the first member to the second member wherein:
  the magnetically attractive coupling mechanism comprises corresponding components that are magnetically attracted to one another, a portion of which components are mounted to a portion of the first member that are at the first location, another portion of which components are mounted to a portion of the second member, also at the first location, the magnetically attractive coupling mechanism being configured to selectively orient the first member and the second member into desired positions; and
  the mechanical coupling mechanism is disposed at a location spaced apart from the magnetically attractive coupling mechanism to provide increased stability, and comprises a first member mechanical coupling portion mounted to a portion of the first member and a second member mechanical coupling portion mounted to a portion of the second member, which first member mechanical coupling portion and second member mechanical coupling portion can be selectively engaged with one another to couple the first member to the second member, reducing movement of a portion of the second member relative to the first member at the second location.

Another embodiment may be directed to a modular furniture assembly as recited in the above paragraph, wherein the first location and the second location are opposite edges relative to one another, such that the dual coupling mechanisms stabilize the two members relative to one another at the opposed first and second locations.

Another embodiment may be directed to a modular furniture assembly as recited, wherein the first location is a lower location and the second location is an upper location.

Another embodiment may be directed to a modular furniture assembly as recited, wherein the magnetically attractive coupling mechanism comprises at least one magnet mounted to a portion of the first member or the second member and at least one attracted member mounted to a portion of the other of the first member or the second member.

Another embodiment may be directed to a modular furniture assembly as recited, wherein the mechanical coupling mechanism comprises a hook and loop coupling mechanism, wherein the second member mechanical coupling portion comprises hook or loop material disposed on a tab which extends laterally from the second member, and the second member mechanical coupling portion comprises the other of the hook or loop material on a corresponding surface of the first member, so that the hook or loop material of the tab engages the hook or loop material of the corresponding surface of the first member when the second member is coupled to the first member.

Another embodiment may be directed to a modular furniture assembly as recited, wherein the second member and the first member both comprise a fabric cover over a foam body.

Another embodiment may be directed to a modular furniture assembly as recited in the above paragraph, wherein the first member further comprises a rigid core about which the foam body is disposed.

Another embodiment may be directed to a modular furniture assembly as recited, wherein the second member further comprises a rigid core about which the foam body is disposed.

Another embodiment may be directed to a modular furniture assembly as recited in any of the above paragraphs, wherein the first member is a base member and the second member is a transverse member.

Another embodiment may be directed to a modular furniture assembly configured such that the furniture assembly can be selectively positioned into various selected positions, the furniture assembly comprising:
 a base member;
 a transverse member;
 dual coupling mechanisms including a lower magnetically attractive coupling mechanism and an upper mechanical coupling mechanism for selectively removably coupling the base member to the transverse member wherein:
  the lower magnetically attractive coupling mechanism comprises corresponding components that are magnetically attracted to one another, a portion of which components are mounted to a lower portion of the base member, another portion of which components are mounted to a lower portion of the transverse member, the lower magnetically attractive coupling mechanism being configured to selectively orient the base member and the transverse member into desired positions; and
  the upper mechanical coupling mechanism is disposed above the lower magnetically attractive coupling mechanism, and comprises a base member mechanical coupling portion mounted to a portion of the base member and a transverse member mechanical coupling portion mounted to a portion of the transverse member, which base member mechanical coupling portion and transverse member mechanical coupling portion can be selectively engaged with one another to couple the base member to the transverse member, reducing movement of a top portion of the transverse member relative to the base member.

Another embodiment may be directed to a modular furniture assembly as recited in the above paragraph, wherein the lower magnetically attractive coupling mechanism comprises at least one magnet mounted to a portion of the base member or the transverse member and at least one attracted member mounted to a portion of other of the base member or the transverse member.

Another embodiment may be directed to a modular furniture assembly as recited, wherein the upper mechanical coupling mechanism comprises a hook and loop coupling mechanism, wherein the transverse member mechanical coupling portion comprises hook or loop material disposed on a tab which extends laterally from a mid-section of the transverse member, and the base member mechanical coupling portion comprises the other of the hook or loop material on a top surface of the base member, so that the hook or loop material of the tab engages the hook or loop material of the top surface of the base member when the transverse member is coupled to the base member.

Another embodiment may be directed to a modular furniture assembly as recited, wherein the transverse member and the base member both comprise a fabric cover over a foam body.

Another embodiment may be directed to a modular furniture assembly as recited in the above paragraph, wherein the base member further comprises a rigid core about which the foam body is disposed.

Another embodiment may be directed to a modular furniture assembly as, wherein the transverse member further comprises a rigid core about which the foam body is disposed.

Another embodiment may be directed to a modular furniture assembly configured such that the furniture assembly can be selectively positioned into various selected positions, the furniture assembly comprising:
  a first member;
  a second member;
  dual coupling mechanisms including a magnetically attractive coupling mechanism and a mechanical coupling mechanism for selectively removably coupling the first member to the second member wherein:
    the magnetically attractive coupling mechanism comprises corresponding components that are magnetically attracted to one another, a portion of which components are mounted to a portion of the first member, another portion of which components are mounted to a portion of the second member, the magnetically attractive coupling mechanism being configured to selectively orient the first member and the second member into desired positions; and
    the mechanical coupling mechanism comprises a first member mechanical coupling portion mounted to a portion of the first member, and a second member mechanical coupling portion mounted to a portion of the second member, which first member mechanical coupling portion and second member mechanical coupling portion can be selectively engaged with one another to mechanically couple the first member to the second member.

Another embodiment may be directed to a modular furniture assembly as recited, wherein the first member is a base member and the second member is a transverse member.

Another embodiment may be directed to a modular furniture assembly as recited, wherein the magnetically attractive coupling mechanism comprises at least one magnet mounted to a portion of the first member or the second member and at least one attracted member mounted to a portion of the other of the first member or the second member.

Another embodiment may be directed to a modular furniture assembly as recited, wherein the mechanical coupling mechanism comprises a hook and loop coupling mechanism, wherein the second member mechanical coupling portion comprises hook or loop material disposed on a tab which extends laterally from the second member, and the first member mechanical coupling portion comprises the other of the hook or loop material on a corresponding surface of the first member, so that the hook or loop of the tab engages the hook or loop of the corresponding surface of the first member when the second member is coupled to the first member.

Another embodiment may be directed to a modular furniture assembly as recited, wherein the second member and the first member both comprise a fabric cover over a foam body.

Another embodiment may be directed to a modular furniture assembly as recited, wherein the first member further comprises a rigid core about which the foam body is disposed.

Another embodiment may be directed to a modular furniture assembly as recited, wherein the second member further comprises a rigid core about which the foam body is disposed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular furniture assembly configured such that the furniture assembly can be selectively positioned into various selected positions, the furniture assembly comprising:
  a base member;
  a transverse member comprising a rigid board core encapsulated by three pieces of foam, including a first piece of foam on one face of the rigid board core, and the second and third pieces of foam being on the opposite face of the rigid board core;
  dual coupling mechanisms including a magnetic coupling assembly and an upper mechanical coupling assembly for selectively, removably coupling the base member to the transverse member wherein:
    the magnetic coupling assembly comprises corresponding components that are magnetically attracted to one another, a portion of which components are mounted to a lower portion of the base member, another portion of which components are mounted to a lower portion of the transverse member, the magnetic coupling assembly being configured to selectively orient the base member and the transverse member into desired positions; and
    the upper mechanical coupling mechanism is disposed above the lower magnetically attractive coupling mechanism, and comprises a base member mechanical coupling portion mounted to a portion of the base member and a transverse member mechanical coupling portion mounted to a portion of the transverse member, which base member mechanical coupling portion and transverse member mechanical coupling portion can be selectively engaged with one another to couple the base member to the transverse member, reducing movement of a top portion of the transverse member relative to the base member;
    wherein the transverse member mechanical coupling portion of the upper mechanical coupling mechanism includes a strap attached to the rigid board core of the transverse member, which strap is attached to a first zipper portion of an interior zipper, the strap and first zipper portion being disposed between the second and third pieces of foam.

2. A modular furniture assembly as recited in claim 1, wherein the magnetic coupling assembly comprises at least one magnet mounted to a portion of the base member or the transverse member and at least one attracted member mounted to a portion of other of the base member or the transverse member.

3. A modular furniture assembly as recited in claim 2, wherein the upper mechanical coupling mechanism comprises a hook and loop coupling mechanism, wherein the transverse member mechanical coupling portion comprises hook or loop material disposed on a tab which extends laterally from a mid-section of the transverse member, and the base member mechanical coupling portion comprises the other of the hook or loop material on a top surface of the base member, so that the hook or loop material of the tab engages the hook or loop material of the top surface of the base member when the transverse member is coupled to the base member.

4. A modular furniture assembly as recited in claim 3, wherein the transverse member and the base member both comprise a fabric cover over a foam body.

5. A modular furniture assembly as recited in claim 4, wherein the base member further comprises a rigid core about which the foam body is disposed.

* * * * *